(12) United States Patent
Negandhi et al.

(10) Patent No.: US 8,915,617 B2
(45) Date of Patent: Dec. 23, 2014

(54) THERMALLY CONDUCTIVE THERMOPLASTIC FOR LIGHT EMITTING DIODE FIXTURE ASSEMBLY

(75) Inventors: Nishant Negandhi, Medina, OH (US); Asis Banerjie, Medina, OH (US)

(73) Assignee: Ovation Polymer Technology and Engineered Materials, Inc., Cleveland, OH (US)

(*) Notice: Subject to any disclaimer, the term of this patent is extended or adjusted under 35 U.S.C. 154(b) by 183 days.

(21) Appl. No.: 13/547,437

(22) Filed: Jul. 12, 2012

(65) Prior Publication Data
US 2013/0094207 A1 Apr. 18, 2013

Related U.S. Application Data

(60) Provisional application No. 61/547,456, filed on Oct. 14, 2011.

(51) Int. Cl.
*F21V 29/00* (2006.01)
*F21V 5/04* (2006.01)
*F21Y 101/02* (2006.01)

(52) U.S. Cl.
CPC .............. *F21V 5/04* (2013.01); *F21Y 2101/02* (2013.01); *F21V 29/244* (2013.01)
USPC ...................... 362/294; 362/373; 362/249.02

(58) Field of Classification Search
CPC  F21Y 2101/02; F21K 9/00; F21W 2131/103; F21V 29/02; F21V 29/004; F21V 29/244; F21V 15/01; F21V 15/011
USPC .................................... 362/294, 373, 249.02
See application file for complete search history.

(56) References Cited

U.S. PATENT DOCUMENTS

| | | | | |
|---|---|---|---|---|
| 7,723,419 | B1 | 5/2010 | Manian et al. | 524/404 |
| 7,824,075 | B2* | 11/2010 | Maxik | 362/294 |
| 8,398,266 | B2* | 3/2013 | Wang | 362/249.02 |
| 8,592,844 | B2* | 11/2013 | Izutani et al. | 257/98 |
| 2001/0048172 | A1 | 12/2001 | Smith et al. | 264/104 |
| 2002/0058743 | A1 | 5/2002 | Tobita et al. | 524/495 |
| 2003/0139510 | A1 | 7/2003 | Sagal et al. | 524/404 |
| 2003/0236335 | A1 | 12/2003 | Sagal et al. | 524/404 |
| 2004/0152829 | A1 | 8/2004 | Tobita et al. | 524/595 |
| 2005/0045855 | A1 | 3/2005 | Tonapi et al. | 524/595 |
| 2005/0161210 | A1 | 7/2005 | Zhong et al. | 165/185 |

(Continued)

OTHER PUBLICATIONS

Hatsuo Ishisa, Sarawut Rimdusit, "Very High Thermal Conductivity obtained by boron nitride-filled polybenzoxzine", "Thermochimica Acta", 1998, pp. 177-186, No. 320, Publisher: Elsevier Science B.V.

*Primary Examiner* — Peggy Neils
(74) *Attorney, Agent, or Firm* — Alvin T. Rockhill

(57) ABSTRACT

The present invention relates to a light emitting diode fixture assembly, having at least one component made out of thermally conductive thermoplastic which is comprised of a thermally conductive thermoplastic composition which is comprised of at least one thermoplastic polymer and at least one thermally conductive filler. The light emitting diode fixture assembly is comprised of (1) at least one light emitting diode, (2) a lens covering a portion of the light emitting diode, (3) a back plate to which the light emitting diode is affixed, (4) the housing for the light emitting diode and the base plate, and (5) electrical connectors which are in electrical communication with the light emitting diode and an electrical supply source with a enclosing cup/sleeve.

20 Claims, 3 Drawing Sheets

(56) References Cited

U.S. PATENT DOCUMENTS

| | | |
|---|---|---|
| 2005/0189523 A1 | 9/2005 | Sagal et al. .................. 252/500 |
| 2005/0209383 A1 | 9/2005 | Miller et al. ................. 524/404 |
| 2006/0121068 A1 | 6/2006 | Sane et al. ................... 424/400 |
| 2008/0153959 A1 | 6/2008 | Charati et al. ................ 524/404 |
| 2010/0165632 A1* | 7/2010 | Liang ........................... 362/294 |
| 2011/0095690 A1* | 4/2011 | Sagal ........................... 315/113 |
| 2012/0307501 A1* | 12/2012 | Tankala et al. ................ 362/294 |
| 2013/0285529 A1* | 10/2013 | Petroski ........................ 313/46 |
| 2013/0335970 A1* | 12/2013 | Jokelainen et al. ...... 362/249.05 |

* cited by examiner

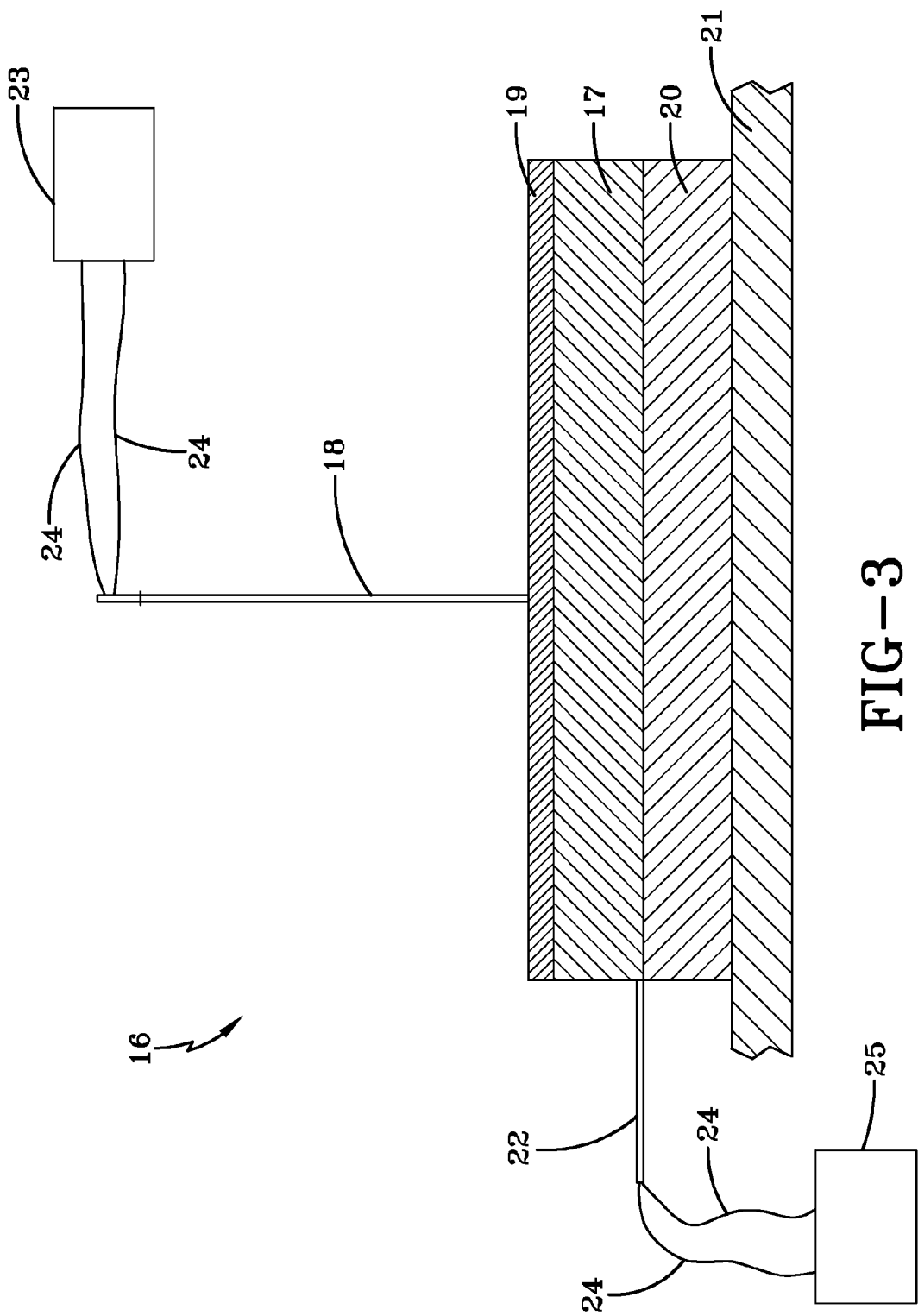

THERMALLY CONDUCTIVE THERMOPLASTIC FOR LIGHT EMITTING DIODE FIXTURE ASSEMBLY

This application claims the benefit of U.S. Provisional Patent Application Ser. No. 61/547,456, filed on Oct. 14, 2011, and incorporates herein by reference the teachings thereof in their entirety.

BACKGROUND OF THE INVENTION

Light-emitting diodes (LEDs) based on solid state lighting technology are likely to replace incandescent and fluorescent bulbs in housing and commercial markets. The modules, bulbs, and fixtures made out of the LEDs/solid state lighting have distinct advantages such as, they are brighter, require less energy, and extend the light's lifetime. Some of the electricity in an LED becomes heat rather than light and if the heat is not removed, the LEDs run at high temperatures, which not only lowers their efficiency, but also makes the LED less reliable and cost effective alternate to current lighting industry. In order to solve the difficult problem in this field, the LED industry has developed many different methods and solutions in addressing key problems such as heat dissipation, shape, luminance, product life and cost. The high power LED illumination still faces a lot of technological challenges at present with regards to improving its efficiency in heat transfer.

The current solution in thermal management involves materials acting as a heat sink made from aluminum, although copper may be used as well. New classes of materials including thermoplastic compounds that are used when heat dissipation requirements are lower than normal or have a complex shape would offer improvements by molding and extrusion which would offer better thermal transfer than copper with a lower weight than aluminum. The improved thermoplastic composition further offers the advantage of being able to be formed into complex two-dimensional parts and can also be easily mass produced.

The present invention relates to a heat dissipating thermoplastic compound composition acting as a both external and internal heat sink which can be easily customized for any given shape and size via regular melt processing techniques in a LED part design. Such a composition can solve the problems of light decay, heat dissipation, and shape adoption in next generation high brightness LEDs.

Another aspect of the current invention is that the thermally conducting composition can be formulated to provide a superior surface finish which provides superior thermal radiation of heat especially at higher temperatures. This is particularly useful in cases where heat is dissipated by radiation and the thermally conductive composition is acting as a reflector. Moreover, a perfectly fused contact area or good interface allows the use of a thinner layer of thermal compound, which will reduce the thermal resistance between the heat sink and LED source.

The prior art in thermally conductive thermoplastic compounds uses boron nitride as a conductive filler. Thermally conductive fillers do not only have to be limited to boron nitride. The prior art also teaches that there are a variety of other fillers available for compounding with thermoplastics that will impart thermal conductivity to a polymer compound. These materials include but are not limited to metals and their alloys, such as copper, aluminum, bronze, gold, silver, iron, lead, stainless steel, titanium, brass, nickel coated fibers, aluminum coated fibers, and metal oxides, such as zinc oxide, aluminum oxide, beryllium oxide, magnesium oxide, iron oxide, and aluminum nitride. The use of ceramics and minerals as thermally conductive fillers is also described in the prior art. These thermally conductive materials include granite, silicon carbide, zirconium silicate, limestone, marble, quartz, and sandstone. Thermally conductive fillers that are known in the prior art also include carbon rich materials such as carbon fibers, carbon nanotubes, carbon nanofibers, diamond, natural and synthetic unexpanded graphite, natural and synthetic expanded graphite, carbon black, diamond powders (synthetic and natural), and graphene.

A limitation of some of the fillers known in the prior art, including boron nitrides, is that thermal conductivity is only realized uni-directionally and therefore through-plane thermal conductivity is delivered at a level which is less than that needed in some important commercial applications. However, prior art teaches that the thermal conductivity of thermoplastic compositions can be increased by the addition of another filler having a low aspect ratio. There is accordingly a need for a composition which can increase through plane thermal conductivity over the levels provided by boron nitride and other conventional thermally conductive fillers.

In addition to having thermal conductivity in some applications it is also critical for thermoplastic compound formulations to impart additional performance characteristics including electrical conductivity, electrical insulativity, processability and flame retardancy. In many cases, enhanced electrical conductivity facilitates electroplating, electroless plating, and primer free electrostatic painting of thermally conductive polymer parts. These plating/painting processes are typically performed by moving ions in an electrolytic solution by an electric field over a given conductive substrate in order to coat said substrate with a thin layer of the material, typically a metal. Thermoplastic material that can be electroplated yields also generally benefits by providing improved wear and mar resistance, lubricity, aesthetics, and corrosion resistance.

The improvement of electrical insulation characteristics also normally contributes to a higher break down voltage of thermally conductive polymer parts. This property is very desirable in numerous electrical and electronic applications. For example in LEDs, an electrically insulative and thermally conductive polymer compound can be used in place of electrically conductive aluminum for making housings, back plates, connectors and sleeves with better results. In these parts, a higher breakdown voltage is typically desired.

Flame retardant chemicals, compounds, and fillers can also be introduced into thermoplastic compounds to improve their flammability ratings. Introducing flame retardants into the thermally conductive thermoplastic compounds helps impart ignition resistance and inhibits or resists the spread of fire. This added property allows for the thermally conductive thermoplastic compound to be utilized safely where a potential for fire exists, meeting the requirements of Underwriter Labs UL-94 and the International Electrotechnical Commission (IEC) IEC 60707, IEC 60695-11-10, and IEC 60695-11-20.

Processability is a very important criterion in manufacturing most articles via conventional molding and extrusion techniques. Good processability is a beneficial characteristic for thermoplastics that are used in almost all applications ranging from conventional injection molding to complex techniques used in specialty applications. However, excellent processability can be critical in many complex molding applications that require a very fine balance of performance properties along with low temperature melting point and easy flow.

SUMMARY OF THE INVENTION

This invention relates to thermally conductive thermoplastic compounds. It is important for all thermoplastics to by easily processable via melt techniques, such as injection molding, extrusion, thermoforming and in some case compression molding and fiber spinning/extrusion. It is also, of course, important for the polymers used in over molding procedures to exhibit good processability.

In cases where fillers are added to thermoplastic elastomers processing can be more challenging. Introducing flow modifiers and the appropriate combination of additives helps us solve this problem and make the final composition easy to overmold at temperatures around 200° C. (which is required to protect the electronics on a circuit board on which the compound will be overmolded). Along with this comes surface properties and finish.

This invention discloses a thermoplastic compound that exhibits through plane thermal conductivity. The formulation of this invention comprises at least a primary thermally conductive filler and possibly a secondary and tertiary thermally conductive filler. Also, disclosed is the ability to add electrically insulative or electrically conductive properties to the disclosed thermoplastic thermally conductive compound via the use of a carbon based substances. It is further disclosed that flame retardant fillers or inherently flame retardant polymers can also be incorporated into the disclosed compound to impart flame retardant properties into the thermally conductive thermoplastic compound.

The present invention more specifically discloses a light emitting diode fixture having a thermally conductive thermoplastic housing therein which is comprised of (1) at least one light emitting diode, (2) a lens covering a portion of the light emitting diode, (3) a back plate to which the light emitting diode is affixed, (4) the thermally conductive thermoplastic housing for the light emitting diode and the base plate, wherein the housing is comprised of a thermally conductive thermoplastic composition which is comprised of at least one thermoplastic polymer, and at least one thermally conductive filler, and (5) electrical connectors which are in electrical communication with the light emitting diode and an electrical supply source.

The present invention further discloses a light emitting diode fixture having a thermally conductive thermoplastic power supply cup therein which is comprised of (1) at least one light emitting diode, (2) a lens covering a portion of the light emitting diode, (3) a back plate to which the light emitting diode is affixed, (4) a housing for the light emitting diode and the base plate, (5) electrical connectors which are in electrical communication with the light emitting diode and an electrical supply source, and (6) the electrical power supply cup, wherein the electrical power supply cup is comprised of a thermally conductive thermoplastic composition which is comprised of at least one thermoplastic polymer, and a thermally conductive filler.

A light emitting diode fixture having a thermally conductive thermoplastic back plate therein which is comprised of (1) at least one light emitting diode, (2) a lens covering a portion of the light emitting diode, (3) at least one heat spreader wherein the heat spreader is comprised of a thermally conductive thermoplastic composition which is comprised of at least one thermoplastic polymer, and at least one thermally conductive filler, (4) a back plate which is affixed to the heat spreader, wherein the back plate is comprised of an electrically conductive metal, (5) a housing for the light emitting diode and the back plate, and (6) electrical connectors which are in electrical communication with the back plate and an electrical supply source.

The present invention further reveals discloses a light emitting diode fixture having an overmolded housing comprising (1) a back plate, (2) a circuit board which is affixed to the back plate, (3) a light emitting diode which is affixed to the back plate and which is in electrical communication with the circuit board, (4) electrical connectors which are in electrical communication with the circuit board, (5) a lens which covers at least a portion of the light emitting diode, and (6) a housing which is overmolded onto the back plate, wherein said housing is comprised of a thermoplastic composition which includes a thermoplastic polymer having a melting point of less than 220° C., and at least one thermally conductive filler The subject invention also discloses a thermally conductive polymeric composition having flame retardancy which is comprised of (1) at least one thermoplastic polymer, (2) at least one thermally conductive filler, (3) at least one flame retardant system, (4) at least one impact modifier, and (5) a surface active agent.

Further the subject invention also discloses a thermally conductive polymeric composition having flame retardancy which is comprised of (1) at least one inherently flame retardant thermoplastic polymer, (2) at least one thermally conductive filler, (3) at least one impact modifier, and (4) a surface active agent.

BRIEF DESCRIPTION OF DRAWINGS

FIG. 3 is a schematic diagram of a device that can be used as a thermal conductivity meter.

REFERENCE NUMERALS USED IN FIGURES

Figures 1, 1A:
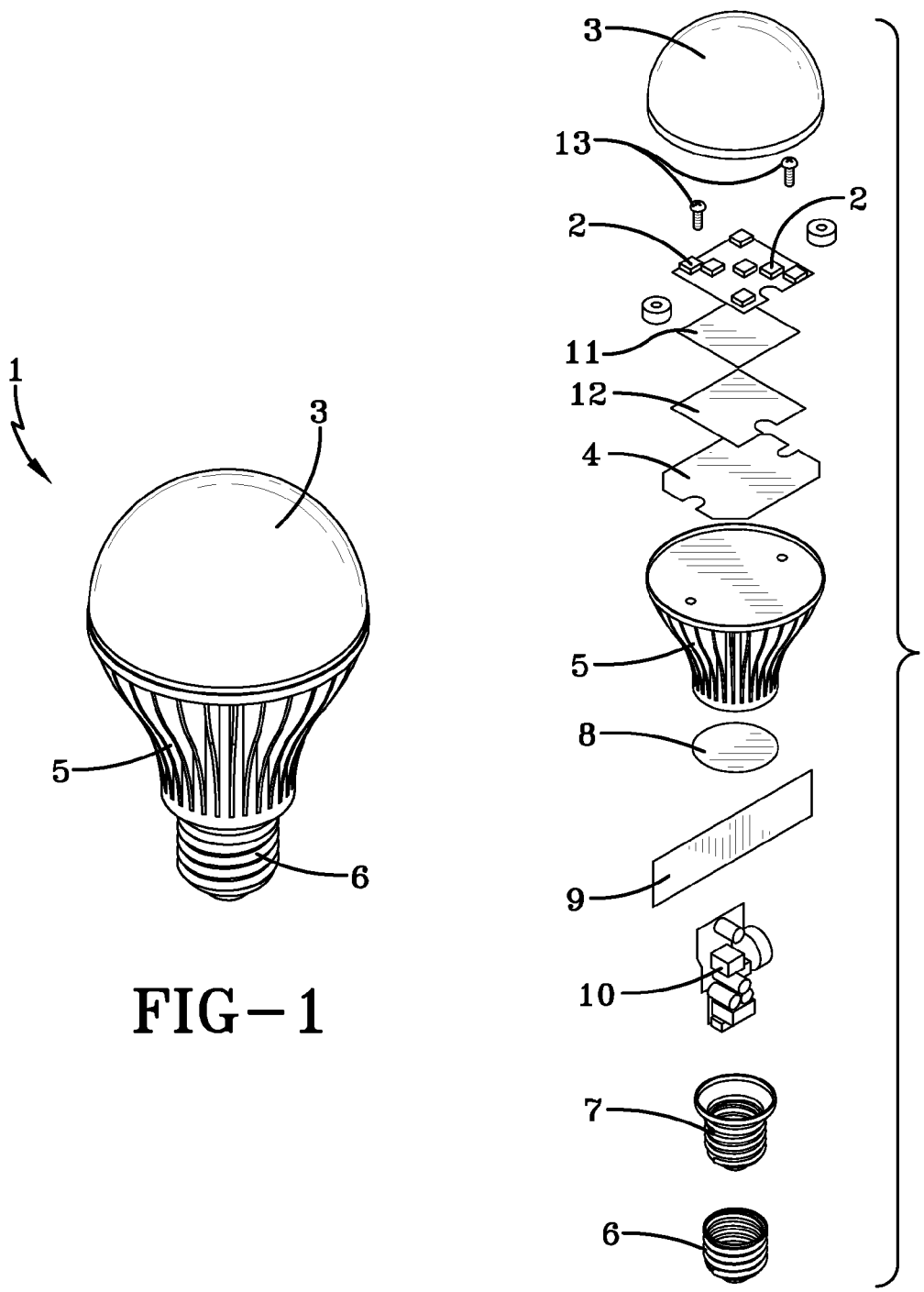
FIG. 1 is a perspective view of a light emitting diode fixture for utilization as a replacement for conventional light bulbs of virtually all types into which the thermally conductive thermoplastic of this invention can be incorporated. Such light emitting diode fixtures are commonly utilized as spotlight bulbs (MR16), candle lights (candelabra bulbs), A series bulbs, and PAR series bulbs (such as PAR 20 of 7 watts, PAR 30 of 13 to 15 watts, and beyond).
FIG. 1a is schematic exploded diagram of a light emitting diode fixture into which the thermally conductive thermoplastic of this invention can be incorporated.

The reference numerals used in the drawings to identify various parts or elements of the light emitting diode fixtures of this invention and the thermal conductivity meter used in the practice of this invention are as follows:

1. light emitting diode fixture
2. light emitting diode
3. lens
4. back plate
5. heat sink
6. electrical connector
7. electrical power supply cup
8. connecting part
9. connection part
10. driver
11. heat spreader
12. heat spreader
13. screws
14. cover plate lens
15. fixture body
16. thermal conductivity meter
17. aluminum block 18. first thermocouple
19. test sample
20. heat source
21. support base
22. second thermocouple
23. first digital temperature readout meter
24. wires
25. second digital temperature readout meter

DETAILED DESCRIPTION OF THE INVENTION

A light emitting diode fixture 1 of the present invention is depicted in FIG. 1. Such a light emitting diode fixture includes at least one light emitting diode 2 and typically includes a plurality of light emitting diodes. The light emitting diode fixture also includes a lens 3 covering at least a portion of the light emitting diode or diodes 2. A back plate 4 supports the LED assembly to a heat sink 5 (body of the fixture or housing) which dissipates heat generated by the light emitting diode(s) from the fixture to its surroundings. The heat sink 5 also typically provides a major component of the body of the fixture. The heat sink 5 typically has a lens 3 attached to one side thereof with an electrical connector 6 which may be in a socket assembly at the other end. The electrical connector 6 is adapted to connect to a power source such as a household or AC power circuit or to a battery supply. The socket assembly typically includes the electrical connector 6, electrical power supply cup 7 (also known as a sleeve), and optionally other connecting parts 8 and 9, and an electrical driver 10 which is typically a circuit board that gives power to the light emitting diodes. The electrical driver 10 typically converts the current supply from alternating current to direct current and preferably provides constant current supply to each light emitting diode in the fixture, and optionally the driver controls current to the light emitting diodes to provide control over lumen output. Optionally, one or more heat spreaders 11 and 12 are used to facilitate rapid dissipation of heat from the light emitting diode to the heat sink, back plate and other components of the fixture assembly. Such heat spreaders help to protect the light emitting diodes from thermal shock and thermal degradation which can result in lower lumens output over time. Optionally, the light emitting diodes can be affixed to the optional heat spreaders 11 and 12 and to the back plate 4 and to connectors such as screws 13.

Figure 2:
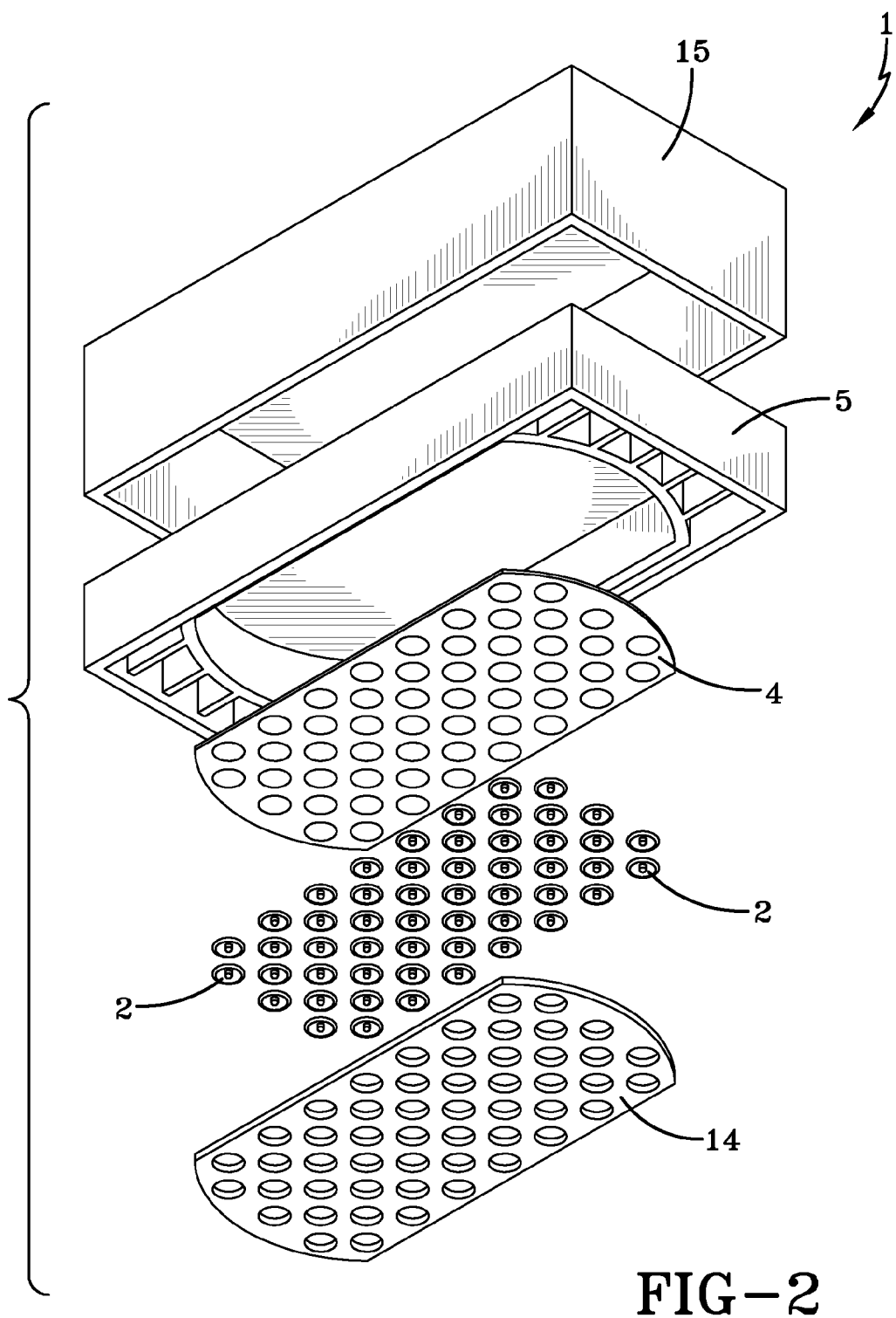
FIG. 2 is a schematic drawing of a second type of light emitting diode fixture which can include component parts which are made of the thermally conductive thermoplastic of this invention. This type of light emitting diode fixture is typically used in office lighting, parking lot lights, street lights and custom design fixtures.

FIG. 2 illustrates another light emitting diode fixture 1 which includes a plurality of light emitting diodes 2, a cover plate lens 14, a back plate 4, a heat sink 5, and a fixture body 15. In this type of light emitting diode fixture, the electrical driver can be located at a position in the fixture body or in a remote external position. For instance, in street and parking lot light applications, it is frequently convention to position the electrical driver on a light pole or in some other position external to the light emitting diode fixture itself. Utilizing external positioning of the electrical driver can prove to be beneficial in some applications because it removes the driver from proximity to the LED heat source and also can provide added flexibility in current control to provide for increasing or decreasing the lumens provided (allows for dimming). It also facilitates replacement of component parts without the need for replacing the entire light emitting diode fixture. For instance, individual LEDs can be replaced without replacing the driver and the driver can be replaced without the need to replace the LEDs. It should be understood that the fixture body 15 and other component parts of the fixture can be designed to be of virtually any desired geometric shape, for instance, it can be rectangular (as shown in FIG. 2), round, square, hexagonal, octagonal, etc. The light emitting diode fixture will typically also include heat spreaders.

The compositions claimed in this specification comprise of at least one primary thermally conductive filler and possibly a secondary and tertiary thermally conductive filler. This composition when added to a thermoplastic, as shown in the examples, imparts thermal conductive properties to the thermoplastic, in particular increases in the through plane and in-plane thermal conductivity.

The thermally conductive filler system that may be utilized in the claimed composition include but are not limited to metals and their alloys, such as copper, aluminum, bronze, gold, silver, iron, lead, stainless steel, titanium, brass, aluminum nitride, aluminum coated fibers, copper coated fibers, and metal oxides, such as zinc oxide, aluminum oxide, beryllium oxide, magnesium oxide, and ceramics and minerals including granite, boron nitride, silicon carbide, zirconium silicate, limestone, marble, quartz, sandstone. Also included in thermally conductive fillers are carbon rich materials such as carbon fibers, carbon nanotubes, carbon nanofibers, diamond, natural and synthetic unexpanded graphite, natural and synthetic expanded graphite, and graphene.

Boron nitrides useful in this composition are generally found in particle form or agglomerate form. When in particle form, the boron nitride appears as platelets having a mean particle size of 35 microns, 12-13 microns and a surface area of 0.1 to 1.0 square meters/gram. These boron nitrides are available from Momentive Performance Materials, Strongsville, Ohio USA, previously known as Advanced Ceramics, Cleveland, Ohio, USA as POLARTHERM® 110 and 220 respectively. In practicing the subject invention it is typically advantageous for the thermally conductive composition utilized in LED fixtures to be void of boron nitrides.

Boron nitride is also available in highly crystalline powdered form. This boron nitride form is typically a very high purity mix of platelets and small to medium agglomerates having a mean particle size of 20-60 and 15-25 microns with a high surface area of 3-5 square meters/gram. These boron nitrides are available from Momentive Performance Materials, Strongsville, Ohio, USA, previously known as Advanced Ceramics, Cleveland Ohio, USA as CoolFlow CF400 and CoolFlow CF300 respectively.

Boron nitride is also available in agglomerates approximating a sphere, or spherical. These agglomerates have a mean particle size of 55-65 microns and a nominal surface area of 5.5 square meters/gm. These boron nitride agglomerates are available as POLARTHERM® XLR 60.

Aluminum nitride is believed to be a good substitute for boron nitride with mixtures of the boron and aluminum nitride contemplated as well. Effective amounts of boron nitride, aluminum nitride or mixture of boron nitride and aluminum nitride when used in combination with a thermoplastic are in the range of 25 to 55 percent by weight of the total composition, with 30 to 50 percent being more effective and 30 to 45 percent being even more effective and 33 to 38 percent being the most effective.

Aluminum oxide has been found to be useful as a thermally conductive filler for thermoplastics, specifically white aluminum oxide. The white aluminum oxide used is a pure, clear white aluminum oxide with low soda and silica content. An ideal average particle size is between 50-100 microns, more specifically 80 microns. The particles of white aluminum oxide tend to be blocky with sharp edges with an alpha alumina, in the hexagonal crystal system structure. This grade of aluminum oxide is available from Washington Mills, North Grafton, Mass., USA as Duralum Special White.

Zinc oxides are believed to also impart high through plane thermal conductivity to thermoplastic compounds. The zinc oxide used is very high purity. The zinc oxide has a particle size of 0.25-0.33 microns, more specifically 0.31 microns and an average surface area of 3.5 square meters/gram. The bulk density of zinc oxide is approximately 50 pounds/cubic foot. This grade of zinc oxide is available from Zochem Inc., Brampton, Ontario, Canada as Zoco 103.

Copper powders are also available as thermally conductive fillers. A purity level of at least 99% is required. A mean particle size should be approximately 30-80 microns, more specifically 40-60 microns. Copper powders are commercially available from a number of suppliers.

The graphite and carbon fibers typically used preferably have an average length which is within the range of about 75 microns to about 250 microns. Such fibers will frequently have a length of about 100 microns (which is within the range of about 75 microns to about 125 microns) and preferably have a length of about 150 micron (which is within the range of 125 microns to 175 microns). Alternative the fibers can be potassium and/or ceramic whiskers. Carbon fibers are derived from primarily two sources: polyacrylonitrile (PAN) and pitch (petroleum based). The PAN based fiber has approximately 55% carbon content and is available from a multitude of sources. The thermal conductivity of PAN based fibers is approximately 200 to 350 W/mK (Watt/meter-Kelvin). Pitch based fibers have approximately 85% carbon content and approach the properties of graphite and are therefore called graphite fibers due to their high carbon content. To be a graphite fiber, the fiber should have more than 80% carbon content. The thermal conductivity of graphite fibers (pitch based fibers) is approximately 900 W/mK.

The expanded graphite can be manufactured by a thermal expansion process. In this process, certain compounds are chemically inserted between the graphite planes and exposed to heat. The chemicals inside the graphite decompose, forcing the graphite layers apart. The expanded graphite has a worm like appearance with an apparent density of about 0.003 g/cc as compared to the theoretical density of 2.6 g/cc for unexpanded graphite. Additionally, expanded graphite can be compressed from 0.003 g/cc to densities up to 1.75 g/cc and greater. U.S. Pat. No. 3,404,061 patent describes how to make expanded graphite in a continuous process. The teachings of U.S. Pat. No. 3,404,061 are incorporated herein by reference for the purpose of teaching a satisfactory method for producing expanded graphite which can be utilized in accordance with this invention.

The aspect ratio of the expanded graphite is believed to lie in the range of 200-300. This is in contrast to the carbon fibers which have a much smaller aspect ratio which is typically within the range of 5 and 50 and which is frequently approximately 10.

The carbon containing substance is effective when present at a level of 5 to 35% by weight of the total composition, more effective at 10 to 30 weight percent of the total composition, with even better results believed obtained at 14 to 26 weight percent and 16 to 24 weight percent of the total composition.

The thermally conductive composition can be mixed with virtually any thermoplastic or composite to make the resultant composition thermally conductive. This composition finds utility when added to a single thermoplastic polymer or blend/alloy. Typically this thermoplastic polymer system will be chosen from the list of polymer systems such as: polyethylene, polypropylene, polyether block polyamides, PEI, polyester block co-polymers, styrenic block co-polymers, styrene based co and ter polymers (such as ABS, HIPS, ASA, SIBS, SEBS, SBS, etc,), polyesters (such as PET, PTT, PETG, PBT, CBT), polycarbonates, polyetheretherketones, PAEK, PEK, polyphylene sulfide, polysulfones, liquid crystalline polymers, thermoplastic elastomers, polyamides, semi-aromatic polyamides (PPA), acrylate polymers (specifically ethylene methacrylate), thermoplastic urethanes and their blends/alloys thereof. Additionally the polymer systems may contain polymeric modifiers, stabilizers, and other additives.

The dicarboxylic acid which can be used in the hard polyesters that are useful in the practice of this invention are typically selected from the group consisting of terephthalic acid, isophthalic acid, naphthalenedicarboxylic acid, diphenyldicarboxylic acid or a mixture of 2 or more thereof. The diol used for the polyester is typically an alkylene glycol that contains 2-10 carbon atoms, 1,6-cyclohexanediol, 1,6-dimethanolcyclohexane or a mixture of two or more thereof. In general, it is preferred that a polyester having a more crystalline structure be used. These polyesters include poly (butylenes terephthalate) (PBT), poly (ethylene terephthalate) (PET), poly (trimethylene terephthalate) (PTT), poly (butylenes isophthalate) (PBI), poly (cyclohexylene-dimethylene terephthalate) (PCT), poly (ethylene naphthalate) (PEN), poly (trimethylene naphthalate) (PTN), and poly (butylenes naphthalate) (PBN).

The polyurethanes that are useful in the practice of this invention will typically consist of prepolymers and/or the thermoplastic polyurethanes (TPU) of the formula of —$R^1$OCONH$R^2$—NHCOO—) as hard segments, where $R^1$ is an alkylene group containing 2-6 carbon atoms and $R^2$ is an aromatic group, and the soft segments having polyalkylene oxide, polyester, polycaprolactone or a copolymer of two or more thereof. The preference is MDI-based polyether, polyester, polycaprolactone, ether-ester and ester-polycaprolactone TPU. The copolyester is polyether-polyester multiblock copolymer, where polyester is aromatic dicarboxylic acid incorporating with alkylene glycols having 2-6 carbon atoms. The preferred copolyester is using polytetrahydrofuran as soft segments and poly (butylenes terephthalate) as hard segments.

Another optional agreement is CBT® 100 low molecular weight thermoplastic resin from Cyclics Corporation of Schenectady, N.Y. This low molecular weight thermoplastic resin is a blend of polybutylene terephthalate oligomers which does not include a polymerization catalyst. It melts into a low viscosity liquid and is not believed to further polymerize into the polybutylene terephthalate polymer (PBT) of higher molecular weight.

To increase cold temperature impact characteristics it can be advantageous in one embodiment of this invention for the composition to contain a rubbery impact modifier composition component which could be one or more rubbery impact modifiers. The type of rubber impact modifier is a polymeric material which, at room temperature, is capable of recovering substantially in shape and size after removal of a force. However, the rubbery impact modifier should have a glass transition temperature of less than 0° C. Better performance is normally attained when the glass transition temperature (Tg) is less than −5° C., −10° C., −15° C., with a Tg of less than −30° C. even better. The Lotader® resins from Arkema, Corporation (France) are some representative examples of such rubbery impact modifiers that can be included in one embodiment of this invention. These particular impact modifiers are functionalized polyolefin ethylene-acrylate terpolymers, such as ethylene-acrylic esters-maleic anhydride (MAH) or glycidyl methacrylate (GMA).

The rubbery impact modifier composition which can optionally be used is preferably a functionalized rubbery impact modifier and can be an ethylene copolymer that functions as a compatibilizing agent or surfactant, in that it forms a covalent bond and/or physical interaction with at least one polyester component and compatibly blends with the polyester component. In most cases, to get the high level of compatibility and physical properties, such as low temperature impact strength, a covalent bond will form between the polyester component and the functionalized rubbery impact modifier. The functionalized rubbery impact modifier component of the thermoplastic resin composition will normally represent from 2.0 weight percent to 50 weight percent of the composition, with 10 to 45 weight percent more preferable and 15 to 40 percent most preferable. The functionalized rubbery impact modifier is preferably present in the composition at a level which is within the range of 10 weight percent to 40 weight percent.

The functionalized rubbery impact modifier will often be a compatibilizing ethylene copolymer of the formula E/X/Y, where E is about 55-75%, X is about 15-35%, and Y is about 2-15% by weight of the compatibilizing ethylene copolymer, and E is ethylene. X is an αβ-ethylenically unsaturated monomer derived from at least one of alkylacrylate, alkylmethacrylate, alkyl vinyl ether, carbon dioxide, sulfur dioxide, or mixtures thereof, where the alkyl groups contain 1-12 carbon atoms, such as vinyl acetate, methylacrylate, butylacrylate, and methyl vinyl ether. X can, for example, be a moiety derived from at least one of alkyl acrylate, alkyl methacrylate, alkyl vinyl ether, carbon monoxide, sulfur dioxide, or mixtures thereof. More specifically, X can, for example, contain up to about 35 weight percent of a moiety derived from at least one alkyl acrylate, alkyl methacrylate, or mixtures thereof where the alkyl groups contain 1-8 carbon atoms.

Y is an α,β-ethylenically unsaturated monomer containing a reactive group, such as epoxide, maleic anhydride, isocyanate, or oxazoline, for example. In one embodiment, Y is selected from the group consisting of glycidyl methacrylate and glycidyl acrylate, maleic anhydride, and isocyanato-ethylmethacrylate.

The functionalized rubbery polymer will typically contain repeat units that are derived from an acrylate monomer of the structural formula:

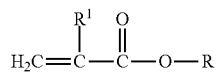

wherein R represents a hydrogen atom, an alkyl group containing from 1 to about 8 carbon atoms, or a moiety containing an epoxy group, and wherein $R^1$ represents a hydrogen atom or an alkyl group containing from 1 to about 8 carbon atoms. Some representative examples of monomers that can be used include methyl methacrylate, butyl acrylate, dimethylsiloxane. In many cases, R will represent an alkyl group containing from 1 to 4 carbon atoms. The moiety containing an epoxy group will typically be of the structural

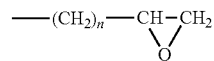

wherein n represents an integer from 1 to about 6. In most cases, n will represent 1. The functionalized rubbery polymer will generally also contain repeat units that are derived from a conjugated diolefin monomer, such as 1,3-butadiene or isoprene, a vinyl aromatic monomer, such as styrene or α-methyl styrene, a monoolefin monomer, such as ethylene or propylene, and/or a dialkylsiloxane monomer, such as dimethylsiloxane.

The functionalized rubbery polymer can optionally contain repeat units in its backbone which are derived from an anhydride group containing monomer, such as maleic anhydride. In another scenario, the functionalized rubbery polymer can contain anhydride moieties which are grafted onto the polymer in a post polymerization step.

In addition, reinforcing fibers and fillers may be incorporated into the thermoplastic elastomers according to the invention. The reinforcing fibers include those of glass, carbon, aromatic polyamide, and thermotropic liquid crystalline polymers. The fillers include talc, glass beads, calcium carbonate, carbon black, minerals, silicates and nano-fillers. Further, polyfluorocarbon compounds such as PTFE may be incorporated into the present elastomers, as well as pigments, thermal stabilizers, UV stabilizers, antioxidants, flame retardants and conductive materials (organic or/and inorganic).

Another class of rubbery impact modifiers that can be utilized in the practice of this invention are polyolefins which are grafted with maleic anhydride. One example of such an impact modifier is Polybond® 3200 polypropylene with 1% maleic anhydride from Crompton Corporation.

Various stabilizer packages are used in polymers for preventing oxidation, chain scission and uncontrolled reactions/recombinations and crosslinking reactions that are caused by photo-oxidation of polymers. Polymers are considered to get weathered or degraded due to the direct or indirect impact of heat and ultraviolet light. The effectiveness of the stabilizers against weathering depends on solubility, ability to stabilize in different polymer matrix, the distribution in matrix, evaporation loss during processing and use. The effect on the viscosity is also an important concern for processing. Various types of stabilizer that are commonly used in polymers are:

Anti-oxidants (primary and secondary)—these are mainly phenolic and phosphite based.
HALS—Hindered amine light stabilizers
UV Absorbers—typical are oxanilides, benxophenones, benxotriazoles and hydroxyphenyltriazines.
Organosulfur compounds—prevents decomposition.
Antiozonants—prevent ozone cracking Various surface active agents have been used in the experiments. This surface active agent has dual purpose:
Viscosity modifier—allows the polymer compound melt to flow easily into the mold or extrude. Here the main purpose is to drop the viscosity so that the material can flow into thin sections and thru thin channels while being processed via injection molding or profile extrusion.
Surface enhancer—provides a smooth scratch resistant surface to the final molded part.

Ideally a low to medium molecular weight polyolefin, silicon oils, plasticizers, lubricants, polydimethylsiloxane (PDMS), acid amides, acid esters, fatty acids, hydrocarbon waxes, metallic soaps (various stearates, stearic acids), etc and the master batch forms of these additives are used as surface active agents.

Electrically conductive additives can also be added to the thermally conductive composite explained above in order to impart electrical conductivity to the end product which is required to facilitate electroplating, electroless plating, and primer free electrostatic painting of the thermally conductive polymer part. This property can be achieved by the use of various functional fillers including: carbon black powder, multiwall carbon nanotubes, single-wall carbon nanotubes, carbon fiber, carbon nanofibers, graphite, graphene, graphite fiber, metal nanoparticles (gold, silver, tungsten, and copper nano particles), metal coated carbon fibers, metal or nanoparticle coated organic and inorganic fillers and other conductive type fillers. The current invention uses a single functional filler or a combination of two or more fillers from the above list. In a typical example, the resulting composite material of this invention consists of 0.1-35% loading of one or multiple conductive fillers as listed above.

TABLE 1

Electrical Conductivity of additives and their composite properties.

| Additives | Volume Resistivity | Properties of Composites |
|---|---|---|
| Antistatic agents | $\sim 10^{11}\ \Omega \cdot cm$ | Isotropic shrinkage<br>Non-sloughing<br>Moderate elongation<br>Colorable<br>Transparent grade |
| Inherently dissipative polymers | $\sim 10^{9}\sim 10^{12}\ \Omega \cdot cm$ | Isotropic shrinkage<br>Colorable<br>Moderate elongation |
| Inherently conductive polymers | $\sim 10^{2}\sim 10^{4}\ \Omega \cdot cm$ | Isotropic shrinkage<br>Colorable<br>Moderate elongation<br>EMI/RFI shielding capability |
| Carbon black | $\sim 10^{2}\ \Omega \cdot cm$ | Isotropic shrinkage<br>Strength/stiffness unchanged<br>Moderate elongation<br>Sloughing<br>High percolation threshold<br>EMI/RFI shielding capability |
| Carbon fiber | $\sim 10\sim 10^{2}\ \Omega \cdot cm$ | Anisotropic shrinkage<br>Increase Strength/stiffness<br>Low elongation<br>Color option<br>Medium percolation threshold<br>EMI/RFI shielding capability |
| Carbon Nanotubes-MWNT, SWNT, SMWNT | $\sim 10\sim 10^{2}\ \Omega \cdot cm$ | Increase Strength/stiffness<br>Low percolation threshold<br>EMI/RFI shielding capability |
| Stainless steel fiber | $\sim 0.10\ \Omega \cdot cm$ | Isotropic shrinkage<br>Strength/stiffness unchanged<br>FDA compliant<br>Moderate elongation<br>EMI/RFI shielding capability |
| Graphite (Various Micron size particles) | $\sim 10\ \Omega \cdot cm$ | Increase Strength/stiffness<br>Medium percolation threshold |
| Nickel-coated graphite | $\sim 10\ \Omega \cdot cm$ | Anisotropic shrinkage<br>Increase Strength/stiffness<br>Low percolation threshold<br>EMI/RFI shielding capability |
| Nickel-coated Carbon Nanotube | $\sim 10\sim 10^{2}\ \Omega \cdot cm$ | Increase Strength/stiffness<br>Low percolation threshold<br>EMI/RFI shielding capability |
| Graphene (Various Micron size particles) | $\sim 0.01\ \Omega \cdot cm$ | Increase Strength/stiffness<br>Medium percolation threshold |

The carbon nanotubes used in making the thermoplastic polymer compositions of this invention normally have a diameter which is within the range of 5 to 20 nanometers and have a length which is within the range of 1 to 5 microns. The carbon nanotubes used in making the thermoplastic polymer composition of this invention more typically have a diameter which is within the range of 7 to 15 nanometers and have a length which is within the range of 1 to 3 microns. The carbon nanotubes used in making the thermoplastic polymer compositions of this invention preferably have a diameter which is within the range of 9 to 10 nanometers and have an aspect ratio which is within the range of 80 to 180 and more typically have an aspect ratio which is within the range of 90 to 150. The carbon nanotubes used in making the thermoplastic polymer composition of this invention preferably have an aspect ratio which is within the range of 95 to 120.

Specialty carbon nanotubes are also used in making the thermoplastic polymer compositions of this invention normally have a diameter which is within the range of 4 to 12 nanometers and have a length which is within the range of 1 to 5 microns. The specialty multiwall carbon nanotubes used in making the thermoplastic polymer composition of this invention more typically have a diameter which is within the range of 6 to 9 nanometers and have a length which is within the range of 1 to 3 microns. The specialty carbon nanotubes typically have 2 to 10 walls and more typically have 3 to 6 walls. The specialty carbon nanotubes used in making the thermoplastic polymer compositions of this invention typically has an aspect ratio of approximately 1,000 (for instance within the range of 800 to 1200).

Carbon black is one of the most popular fillers used in conductive polymers because of its low cost. Since its aspect ratio (ratio of length to diameter) is very small due to the particulate shape, and its percolation threshold is very high, the particles can be interconnected to be conductive. The conductive carbon black used in making the thermoplastic polymer compositions of this invention has an average particle size of 30 to 90 microns. More typically, the conductive carbon black used in making the thermoplastic polymer compositions of this invention has an average particle size of 40 to 60 microns.

A combination of various conductive fillers can have a synergistic effect on the conductivity of polymer composites. For example, the combination of graphite with regular carbon fiber had higher conductivity than any one of them with the same amount of loading. The combination of carbon black, regular carbon fiber, and graphite also has better EMI shielding effectiveness than any one of them or two of them. The synergistic effects have been also found from the incorporation of ICP (inherently conductive polymers) with conductive fibers.

Flame retardant chemicals, compounds, and fillers can also be introduced into thermoplastic compounds to improve their flammability ratings. Introducing flame retardants into the thermally conductive thermoplastic compounds helps impart ignition resistance and inhibits or resists the spread of fire. This added property allows for the thermally conductive thermoplastic compound to be utilized safely where a potential for fire exists. Depending on which base thermoplastic resin is chosen for the composite, will determine which flame retardant is needed.

Typical flame retardants utilized in the thermoplastic industry include: bisphenol-A, disphenylphosphate, 1,2-bis(tribromophenoxy)ethane, brominated epoxy oligomers, brominated polystyrene, chlorendic anhydride, chlorinated paraffins, decabromobiphenyl, decabromodiphenylethane, decabromodiphenyloxide, dechlorane plus, dibromoneopentylglycol, ethylene-bis(5,6-dibromonorbornane-2,30dicarboximide), ethylene-bis(tetrabromophthalimide), halogenated polyetherpolyols, hexabromocyclododecane, octabromodiphenyloxide, octabromotrimethylphenylindane, pentabromodiphenyloxide, poly(dibromostyrene), poly(pentabromobenzylacrylate), resorcinol diphenylphospate, tetrabromo-bisphenol-A, tetrabromo-bisphenol-A,bis(2,3-dibromopropyl ether), tetrabromo-bisphenol-A, carbonate oligomers, tetrabromophthalate diols, tetrabromophthalic anhydride, and triphenylphosphate.

With some of the flame retardants listed above it is beneficial and necessary to use a synergist. Typically, antimony dioxide is the synergist of choice, however, others can include: sodium antimonite, iron oxide, zinc borate, zinc phosphate, and zinc stannate.

After the correct amounts of thermally conductive, electrically conductive, flame retardant fillers and/or stabilizers, modifiers, and other additives are added to the composition, the amount of thermoplastic in the composition makes up the remaining amount. The thermoplastic compound may be present at 10 to 60 percent by weight of the total composition, with 15 to 55 weight percent being more preferred, and 20 to 45 weight percent being even more preferred.

In one embodiment of this invention the thermally conductive thermoplastic polymeric composition employed in making the heat sink fixture/housing and/or sleeve is comprised of a medium viscosity polyamide polymer, a thermally conductive filler system, an impact modifier, a flame retardant system and a surface active agent, wherein:
  the polyamide polymer is present in the composition at a level which is within the range of 10 weight percent to 50 weight percent, more preferably in the range of 20 weight percent to 30 weight percent;
  the thermally conductive filler system is present in the composition at a level which is within the range of 30 weight percent to 70 weight percent, more preferably in the range of 40 weight percent to 55 weight percent;
  the impact modifier is present in the composition at a level which is within the range of 1 weight percent to 15 weight percent, more preferably in the range of 2 weight percent to 5 weight percent;
  the flame retardant system is present in the composition at a level which is within the range of 10 weight percent to 20 weight percent, more preferably in the range of 12 weight percent to 16 weight percent; and
  the surface active agent is present as an mixture of 2 surface active agents in the composition at a level which is within the range of 0.1 weight percent to 5 weight percent, more preferably in the range of 0.5 weight percent to 3.0 weight percent In such compositions the polyamide polymer can be selected from the group consisting of polyamide 6, polyamide 66, polyamide 46, polyamide 12, polyamide 11, semi-aromatic polyamides (PPA), co-polyamides and mixtures thereof. Further in such combinations, the thermally conductive filler system is selected from the various particles such as graphites, metal oxides, ceramics and carbon blacks or fibers. In one such example this thermally conductive filler system comprises of natural or synthetic graphite particles (platelet type) and zinc oxide. In another example, it can consist of only one type of graphite particle or a combination of various grades of graphites. In another example (for electrically insulative grades of compound for sleeve), this filler combination consists of only zinc oxides or zinc oxides combined with aluminium oxides or any metal oxides with ceramic particles.

The impact modifier is typically a meleated polyolefin, such as like maleic anhydride grafted polyethylene, maleic anhydride grafted polypropylene, maleic anhydride grafted ethylene copolymers and combinations thereof.

The flame retardant system is typically selected to include a combination of primary flame retardant and a synergist in the preferred ratio range of 5:1 to 3:1. The primary flame retardants are brominated epoxy oligomers, brominated polystyrene, chlorendic anhydride, chlorinated paraffins, decabromobiphenyl, decabromodiphenylethane, decabromodiphenyloxide, dechlorane plus, dibromoneopentylglycol, ethylene-bis(5,6-dibromonorbornane-2,30-dicarboximide), and the synergist is typically antimony trioxide, antimony dioxide or zinc borate. The surface active agent mixture is typically comprising of a polyethylene based polymer and a Polydimethylsiloxane (PDMS) in its original form or as a master batch.

In another embodiment of this invention the thermally conductive thermoplastic polymeric composition employed in making the high temperature resistant heat sink fixture, housing, sleeve, or back plate is comprised of an high performance polymer, a thermally conductive filler system, an impact modifier, and a surface active agent, wherein:
  the high performance polymer is present in the composition at a level which is within the range of 10 weight percent to 60 weight percent, more preferably in the range of 30 weight percent to 50 weight percent and most preferably in the range of 35 weight percent to 45 weight percent;
  the thermally conductive filler system is present in the composition at a level which is within the range of 30 weight percent to 70 weight percent, more preferably in the range of 40 weight percent to 55 weight percent;
  the impact modifier is present in the composition at a level which is within the range of 1 weight percent to 15 weight percent, more preferably in the range of 2 weight percent to 5 weight percent; and
  the surface active agent is present as an mixture of 2 surface active agents in the composition at a level which is within the range of 0.1 weight percent to 5 weight percent, more preferably in the range of 0.5 weight percent to 3.0 weight percent.

In such compositions the high performance polymer can be selected from the group consisting of polyphylene sulphide (PPS), semi-aromatic polyamides (PPA), polyetheretherketones (PEEK), liquid crystal polymers (LCP) and sulfone polymers (PSU, PES, PPSU) Further in such combinations, the thermally conductive filler system is selected from the various particles such as graphites, metal oxides, ceramics and carbon blacks or fibers. In one such example this thermally conductive filler system comprises of natural or synthetic graphite particles (platelet type) and zinc oxide. In another example, it can consist of only one type of graphite particle or a combination of various grades of graphites. In another example (for electrically insulative grades of compound for sleeve), this filler combination consists of only zinc oxides or zinc oxides combined with aluminium oxides or any metal oxides with ceramic particles.

The impact modifier is typically a meleated polyolefin such as maleic anhydride grafted polyethylene, maleic anhydride grafted polypropylene, maleic anhydride grafted ethylene copolymers and their combinations. The surface active agent mixture is typically comprising of a polyethylene based polymer and a polydimethylsiloxane (PDMS) in its original form or as a master batch.

In a further embodiment of this invention the thermally conductive thermoplastic polymeric composition employed in making the high thermally conductive sheets, films, plates is comprised of an polymer system, and a thermally conductive filler system, wherein the polymer is present in the composition at a level which is within the range of 10 weight percent to 50 weight percent, more preferably in the range of 12 weight percent to 40 weight percent and most preferably in the range of 15 weight percent to 25 weight percent; and wherein the thermally conductive filler system is present in the composition at a level which is within the range of 40 weight percent to 90 weight percent, more preferably in the range of 50 weight percent to 75 weight percent.

In such compositions the polymer systems can be selected from any of the base polymers and mixtures thereof. Further in such combinations, the thermally conductive filler system is selected from the various types of graphites, and mixtures thereof.

This invention is illustrated by the following examples that are merely for the purpose of illustration and are not to be regarded as limiting the scope of the invention or the manner in which it can be practiced. Unless specifically indicated otherwise, parts and percentages are given by weight.

The above defined composite systems can be prepared by using a co-rotating twin screw extruder; such as a 25 mm diameter (D) twin-screw extruder from Berstorff, GmbH which was used in making various test formulations. The components of the formulations were fed in two schemes; (i.) all from the throat of the extruder, passing it through a length of 44D and (ii.) the conductive filler only fed from the side-feeder, with the other components from the throat. The system was typically degassed by vacuum. A twin screw extruder can beneficially be utilized in processing the above defined composite material. Pellets were collected by running the strands through a strand-pelletizer. Other melt blending/compounding techniques such as single screw extruders and banbury mixers can also be used.

The amount of shear applied during melt mixing should be the amount required for dispersion while still maintaining the structure of the thermal fillers. The amount of shear and how to increase or decrease the shear is dependent upon the attributes of a given composition and the mixing device and the mixing parameters such as screw design, back pressure, horsepower, and rpms of the screw relative to the output. These are all well-established independent variables commonly used to introduce shear into a mixing device such as an extruder.

Test Methods

Using basic steady state heat transfer equations, a cost-effective apparatus that would measure through plane thermal conductivity was modeled and designed. The thermal conductivity meter developed is based on a hot plate testing method. A schematic diagram of such a thermal conductivity meter is illustrated in FIG. 3. The thermal conductivity meter 16 includes an aluminum block 17 with a polymeric test sample 19 being positioned above the aluminum block 17. The aluminum block 17 is positioned above a heat source 20 such as a hot plate, which is positioned above a base support 21. A first thermocouple 18 is connected to the surface of polymeric test sample 19 and a second thermocouple 22 is connected to the surface of the aluminum block 17 as illustrated in FIG. 3. The first thermocouple 18 is connected to a first digital temperature readout meter 23 via electrically insulated wires 24 and the second thermocouple 22 is connected to a second digital temperature readout meter 25 with electrically insulated wires 24.

As heat is transferred though a medium normal to its surface, temperature is reduced through the resistance of the material. This resistance is related to the thermal conductivity of the material. Using this relationship, thermal conductivity of the sample can be realized. A few assumptions are also made during the measurement and calculation of thermal conductivity when made via a thermal conductivity meter. The assumptions made include:

a. Steady state
b. Apparatus is adiabatic with surroundings
c. Constant properties
d. Thickness of sample is much less than the length of the sample
e. Thermal conductivity of aluminum is much greater than the thermal conductivity of the sample
f. The sample covers the total area of the aluminum block The thermal conductivity data collected was comparable to data attained from a laser flash type thermal conductivity meter.

The volume resistivity of a molded specimen was measured by direct-current (DC) resistance along the length direction around 40 mm at room temperature. The resistivity was converted to volume resistivity, $\rho_v$ as $\rho_v = WDR_v/L$, where W is the width, D the thickness, L the length of the specimen, and $R_v$ is the measured resistance. The data was the average of 10 specimens with standard deviation to the mean less than 5%.

Electrical conductivity was calculated by the following formula:

$$\sigma = \left(\frac{V}{I} \times \frac{\pi}{\ln 2} \times t\right)^{-1}$$

wherein σ is electrical conductivity, V, I and t are current, voltage, and thickness of the sample, respectively. It should be noted that the thickness is not much smaller than the distance between the probes so that electrical conductivity obtained is not real surface conductivity. The average conductivity of each specimen will be obtained from measurements at four different locations.

The thermal properties will be characterized by thermogravimetric analyzer (TGA), and differential scanning calorimetry, DSC. The mechanical properties (i.e. tensile strength, tensile modulus, elongation, toughness) will be tested by Instron. The heat distortion temperature (HDT) is determined by HDT tester.

Experimental

TABLE 2

Details of Ingredients used in the experiments are listed in below table:

| MATERIAL | SUPPLIER | GRADE | SPECIFICATIONS |
| --- | --- | --- | --- |
| ABS | CHI MEI Corporation | Polyac PA757 | General purpose acrylonitrile |
|  | Sabic Innovative Plastics | Cycolac MG94 | butadiene styrene. Melt flow rate = 1.8 g/10 min. |
| HDPE | Ashland Distribution | Hival 511051 | High flow HDPE grade |
| PP copoly | Ashland Distribution | Hival PP CP 2620 NAT | General purpose PP copolymer |
| PP | Ashland Distribution | Hival PP HO 2420NA NAT | A homopolymer resin designed |
|  | ExxonMobil Chemical | ExxonMobil ™ PP3155 | for spunbond nonwovens. Particularly suited for excellent spinning for uniform, high quality fabrics. Melt flow rate = 36 g/10 min. |

TABLE 2-continued

Details of Ingredients used in the experiments are listed in below table:

| MATERIAL | SUPPLIER | GRADE | SPECIFICATIONS |
|---|---|---|---|
| LDPE | Ashland Distribution<br>Westlake Polymer LLC | Petrothane NA870252 LDPE<br>LLDPE HIFOR GT4157<br>LF2018AB | Linear low density polyethylene with a melt flow rate = 0.8 g/10 min and density = 0.924. Ideal for sheet and tubing. |
| Nylon 6,6 | BASF | Ultramid A34 | General purpose Polyamide 66 |
| Nylon 4,6 | DSM corporation | Stanyl TW341 | |
| PC | Bayer Materials<br>Teijin | Makrolon 2408<br>Powder PC Panlite 1225 WX | General purpose PC resin - 20-24 MFI |
| PBT | Dupont | Crastin 6131-PBT | High Flow PBT |
| PBT Cyclized | Cyclics Corporation | CBT 100 or 500 | Cyclic butylene terepthalate |
| PTFE | Daikin | PTFE L-5F | Surface active PTFE |
| EMA | ExxonMobil Chemical | Optema ™ TC120 ot TC141 | Ethylene methyl acrylate copolymer intended for extrustion coating, coextrusion coating and extrusion lamination. Melt flow rate = 6 g/10 min. |
| PET | generic | PET | General purpose PET |
| PETG | SK Chemicals | Skygreen ® S2008 | General purpose polyethylene terephthalate glycol. |
| PPS | Ticona | Fortron 0205 PPS | Compounding grade Polyphylene Sulphide |
| LCP | Ticona | Vectra LCP E950 | High strenght, electrcial grade Liquid Crystal Polymer |
| SEBS (TPE) | Kraton Corporation | Kraton 1901X | Maleated SEBS |
| TPU | Merquinsa | PearlThane ® 11T93 | A polycaprolactone copolyester based thermoplastic polyurethane with a shore hardness = 93 A. |
| TPU | Merquinsa | PearlThane ® 15N70 | A polyether copolymer-based thermoplastic polyurethane with a shore hardness = 72 A. |
| TPU | Merquinsa | PearlThane ® D15N80 | A polyether-based thermoplastic polyurethane with a shore hardness = 81 A. |
| Carbon Nanotubes (C100) | Arkema | Graphistrength ™ C100 | Multi-walled carbon nanotubes with a mean number of walls = 5-15, outer mean diameter = 10-15 nm, and length = 0.1-10 μm. |
| Carbon Nanotubes (Baytubes) | Bayer Materials | Baytubes ® 150HP | Multi-walled carbon nanotubes with a mean number of walls = 3-15, outer mean diameter = 13-16 nm, and length = 1->10 μm. |
| Carbon Nanotubes (Nanocyl) | NANOCYL S.A. | Nanocyl ™ NC 7000 | Multi-walled carbon nanotubes with an aspect ratio >150. |
| Carbon Nanotbues (SWeNT) | SouthWest NanoTechnologies | SWeNT ® SMW-100 | Specialty Multiwalled carbon nanotbues with a mean number of walls = 3-6, a mean diameter = 6.6 nm, and an aspect ratio ~1,000. |
| Carbon Nanotubes (Cnano) | Cnano Technology Limited | Flotubes ™ 9000 | Multi-walled carbon nanotubes with an average diameter = 11 nm, and an average length = 10 μm. |
| Flame Retardants | Akzo Nobel<br>Albemarle<br>BASF<br>Bright Sun/Albemarle<br>CHEMPOINT<br>Clariant Corporation<br>ICL Corporation | Perkalite FR100<br>Saytex 120<br>Saytex 8010<br>Saytex HP 3010<br>Melapur 200<br>Antimony Trioxide<br>DE-83R<br>Exolit OP 1230<br>ICL FR 1025 | Various FR's used ranging form brominated materials to non-hals |
| Antioxidant | Amfine<br>Maroon Chemical<br>HM Royal | AO-412S<br>Sunox 626<br>Ethanox ® 310 | High molecular weight thioether antioxidant<br>Phosphate antioxidant<br>Tin-free antioxidant |
| Modifier | Arkema | Lotader 8900 | A random terpolymer of ethylene, acrylic ester and glycidyl metacrylate with a melt flow rate = 6 g/10 min. |
| Modifier | Arkema | Lotader ® 4700 | A random terpolymer of ethylene, acrylic ester and maleic anhydride with a melt flow rate = 7 g/10 min. |

TABLE 2-continued

Details of Ingredients used in the experiments are listed in below table:

| MATERIAL | SUPPLIER | GRADE | SPECIFICATIONS |
| --- | --- | --- | --- |
| Modifier | Clariant Corporation | Licocene ® PE 4351 | Maleic-anhydride-modified polyethylene |
| Modifier | Kraton Polymers LLC | Kraton ® FG 1901G | A linear triblock copolymer based on styrene and ethylene/butylene with a polystyrene content of 30%. Melt flow rate = 14-28 g/10 min and shore hardness = 71 A. |
| Modifier | Polyram Ram-On Industries | Bondyram ® 6000 | Maleic anhydride modified ABS. Compatibilizer and coupling agent for styrene compounds with a mass flow rate of 8 g/10 min. |
| Carbon Black | Cabot Corporation | Volcan ® XC-72 | High surface area conductive carbon black |
| Coupling Agent | Chemtura | Polybond ® 3200 | Maleic anhydride modified homopolymers polypropylene used as a coupling agent. |
| CBT | Cyclics Corporation | CBT 100 | Melts to water-like viscosity when heated, then polymerizes into the engineering thermoplastic polybutylene terephthalate. |
| Lubricants and Flow/Rheology Modifiers | Dupont Elastocon TPE Technologies, Inc. Wacker Silicones | Fusabond E MB-226DE Fusabond N493D Elastocon 2810 ZN Stearate Genioplast Pellet S | standard and generic versions of various additives. |
| Lubricant | Harwick Standard | Stan-Lube 6056 Mineral | Processing oil lubricant |
| Hytrel | DuPont | Hytrel ® 4069 | Low modulus grade with a nominal hardness of 40D and melt flow of 8.5 g/10 min. |
| Pigments | Dupont Mayzo | Tipure R104 Benetex OB-1 | Basic titanium dioxide for white color and generic optical brightners |
| PPA | Eyonik Solvay Advanced Polymers, LLC | Vestamid Htplus M3000 Amodel A-1006 | These are Semi-Aromatic Polyamides - PPA's |
| Pebax | Arkema | Pebax MH1637 | Polyether block amides, plasticizer-free, thermoplastic elastomers |
| Thermoplastic Elastomer | Kaneka Corporation | Sibstar ® 073T | Thermoplastic elastomer with a shore hardness = 45 A and melt flow rate = 7 g/10 min. |
| Thermoplastic Elastomer | Kaneka Corporation | Sibstar ® 103T | Thermoplastic elastomer with a shore hardness = 46 A and a melt flow rate = 0.10 g/10 min. |
| Coupling Agent | Kenrich Petrochemicals | Kenrich ® Capow L38 | Titanate coupling agent |
| Other Filler | Momentive Performance Materials | Cool Flow CF 300/Polar therm 110 and PTX 60 Cool Flow CF400 | Boron Nitrides - Various Grades - Platelets to loosely attached aglomarates |
| Siloxane | Multibase, A Dow Corning Company | Siloxane Masterbatch MB50-001 | Masterbatch consisting of 50% ultra-high molecular weight siloxane polymer dispersed in polypropylene homopolymer. |
| Ketone Polymers | Victrex, Evonik, Gharda | Various grades of Victrex PEEK, Vestakeep and Gharda's PAEK | Various types of Ketone polymers for high temp applications. |
| Synthetic Diamond | Hyprez MA Diamond PDR | Hyprez MA Diamond PDR | Diamond Powder |
| Carbon Fiber | SGL carbons Toho Tenax Teijin | Sigrafil C30 Tenax C493 Rehema A201 | Generic carbon and graphite fibers |
| Other Additives | Unitex | Uniplex 214 | BBSA type plasticizer for Polyamides |
| Graphite Filler | SGL carbons Superior Graphites XG Sciences | GFG 200/500 Superior 2025 Graphite Superior 8224 Graphite xGnP-M-15 xGnP-M-25 | Various Graphites: thermally expanded graphites, natural flakes, synthetic graphites, graphenes, etc. |
| Thermal Filler | Washington Mills Duralum Special White Zochem | Duralum Special White Al2O3 180 Zoco 103 | Various Fillers: Metal oxides to ceramics to metal fibers and powders |

TABLE 2-continued

Details of Ingredients used in the experiments are listed in below table:

| MATERIAL | SUPPLIER | GRADE | SPECIFICATIONS |
|---|---|---|---|
| | Zircocem (Jyoti Ceramic) | Zircocem-1 | |
| | SCM Metal Products | 500RL Copper Fibers | |

Tables 3 through 13 list the resin compositions (Experiments 1-45). The compositions were made by reactive extrusion to make engineering thermoplastics. This was normally done by adding a dry blend mixture of the polymers, modifiers, stabilizers, processing aids, and fillers as a single feed into the feed hopper of a twin screw extruder with controlled specific energy input via control of feed rate (15 to 95% torque), RPM (60 to 900 rpm), process temperature (as per the base polymer system) and residence time distribution in various extruder stages. The specific energy input was typically within the range of 0.2 to 0.5 kilowatt hours per kilogram and was more commonly within the range of 0.25 to 0.35 kilowatt hours per kilogram. It should be noted that some compositions can be prepared employing other suitable mixing devices for melt blending, such as a single screw extruder or a multiple single screw extruder or a combination of internal mixers such as banbury and single or twin screw extruders or similar mixing devices. In practicing this invention any mixing equipment and techniques which result in an essentially homogenous dispersion of components can be used to obtain the desired results.

In an alternative method/procedure used, the thermoplastic thermally conductive compound material was made by charging the main feeder of a Berstorff ZE-25 twin screw extruder (L/D=44) with the ingredients. In another of the procedures used, a thermoplastic thermally conductive compound was made by a reactive blending/extrusion process using split-feed technology, wherein in a twin screw extruder (extruder length of 36D to 52D, wherein D is the diameter of the extruder screw), the select ingredient (mainly dispersion polymeric resin or mixture of resins and additives and thereof) was premixed and charged from the main feeder and the dispersed phase thermally conductive additives were introduced into the melt at a downstream feed port location at a distance of 8D to 30D, from the main feed throat of the extruder.

The operating conditions for the reactive extrusions used a screw speed of 200 to 600 RPM, a temperature profile of 30-45° C. (feed), 150-360° C. (Zone 2), 160-385° C. (Zone 3), 160-390° C. (Zone 4), 170-400° C. (Zone 5), 170-400° C. (Zone 6), 170-400° C. (Zone 7), 160-405° C. (Zone 8), and 160-400° C. (die). The specific barrel and die temperatures are based on the base polymer and additive system used. The product was pelletized and dried between 60-120° C. for 2-4 hours to a moisture content of less than 0.05% by weight. Then, test specimens (as per ASTM and ISO) were made by injection molding and were allowed to condition at a temperature of 23° C. for at least 24 hours before testing. The thermal, electrical and mechanical properties of these compounded materials are listed in the same tables below the respective compositions.

TABLE 3

Experiments - Formulation and Test Results - 1 through 5

| Thermally Conductive + Electrically Insulative | EXPERIMENT # | | | | |
|---|---|---|---|---|---|
| | 1 | 2 | 3 | 4 | 5 |
| MATERIALS | | | | | |
| Vectra LCP E950 | 48.70 | — | — | — | — |
| Hival PPCO 2620 | — | 48.70 | — | — | — |
| Hival PP 2420 | — | — | 80.00 | — | — |
| Ultramid A34 | — | — | — | 38.00 | 60.00 |
| Fusabond N493D | 5.00 | — | — | 4.00 | — |
| HDPE 511051 | — | — | — | 6.00 | — |
| Polybond 3200 | — | 3.00 | — | — | — |
| PTFE L-5F | — | — | — | 1.00 | — |
| Ninor (PSNYL) | — | — | — | 0.50 | — |
| Genioplast Pellet S | 1.00 | — | — | 0.50 | — |
| Ethanox 310 | 0.15 | 0.15 | — | — | — |
| Sunox 626 | 0.15 | 0.15 | — | — | — |
| ZoChem 103 | 35.00 | 20.00 | — | 35.00 | — |
| GFG 200 | 2.00 | — | — | — | — |
| PolarTherm 110 | 4.00 | 28.00 | — | 10.00 | — |
| Cool Flow CF 300 | 4.00 | — | — | — | — |
| Graphite TC307 | — | — | 20.00 | — | — |
| Barium Titanate | — | — | — | 5.00 | — |
| PTX60 | — | — | — | — | 40.00 |
| Total | 100 | 100 | 100 | 100 | 100 |
| PROPERTIES | | | | | |
| Thermal Conductivity (W/mK) | 1.767 | 1.174 | 0.983 | 1.402 | 1.779 |
| Surface Resistance Plaque (ohms/sq) | 3.10E+12 | 3.50E+12 | 3.40E+11 | 5.00E+12 | 5.00E+12 |
| Tensile Modulus (MPa) | 4227.60 | 4335.20 | 2111.51 | 3426.71 | 9175.80 |
| Tensile Stress @ Yld (MPa) | 19.96 | 21.50 | 33.90 | 35.32 | 57.50 |

TABLE 3-continued

Experiments - Formulation and Test Results - 1 through 5

| Thermally Conductive + Electrically Insulative | EXPERIMENT # | | | | |
|---|---|---|---|---|---|
| | 1 | 2 | 3 | 4 | 5 |
| Tensile Stress @ Break (MPa) | 19.93 | 21.00 | 32.47 | 35.23 | 56.50 |
| Tensile Strain @ Break (%) | 1.06 | 3.50 | 5.57 | 4.01 | 1.71 |
| Flexural Modulus (MPa) | 5235.35 | 1632.60 | 2205.41 | 3598.26 | 7399.90 |
| Flexural Stress @ Break (MPa) | 31.90 | 37.40 | 55.97 | 66.25 | 104.70 |
| Impact Strength (ft-lb/in) | 0.36 | 0.93 | 0.42 | 1.11 | 0.70 |
| Density | 1.8560 | 1.3730 | 1.0240 | 1.7230 | 1.4057 |

TABLE 4

Experiments - Formulation and Test Results - 6 through 10

| Thermally Conductive + Electrically Insulative | EXPERIMENT # | | | | |
|---|---|---|---|---|---|
| | 6 | 7 | 8 | 9 | 10 |
| MATERIALS | | | | | |
| Ultramid A34 | 24.00 | — | — | — | — |
| Fortron 0205 PPS | — | 42.00 | 42.00 | 42.00 | 44.70 |
| Cycolac MG94 | 5.00 | — | — | — | — |
| Bondyram 6000 | 5.00 | — | — | — | — |
| CBT 100 | — | 2.00 | 2.00 | 2.00 | 2.00 |
| Genioplast Pellet S | 0.50 | 1.00 | 1.00 | 1.00 | 1.00 |
| Ninor (PSNYL) | 0.50 | — | — | — | — |
| HDPE 511051 | — | 3.00 | 3.00 | 3.00 | — |
| Lotader 8900 | — | 2.00 | 2.00 | 2.00 | 3.00 |
| Ethanox 310 | — | — | — | — | 0.15 |
| Sunox 626 | — | — | — | — | 0.15 |
| Duralum Special White Al2O3 180 | 20.00 | — | — | — | — |
| Zochem 103 | 45.00 | — | — | — | — |
| GFG 200 | — | — | 20.00 | 20.00 | — |
| Cool Flow CF400 | — | — | 30.00 | — | — |
| Zircocem-1 | — | — | — | 30.00 | — |
| PTX 60 | — | 30.00 | — | — | 50.00 |
| Rahema A201 | — | 20.00 | — | — | — |
| Total | 100 | 100 | 100 | 100 | 100 |
| PROPERTIES | | | | | |
| Thermal Conductivity (W/mK) | 1.579 | 1.428 | 1.884 | 1.557 | 1.441 |
| Surface Resistance Plaque (ohms/sq) | 4.20E+11 | 2.10E+11 | 1.80E+11 | 4.60E+11 | 5.90E+11 |
| Tensile Modulus (MPa) | 5428.13 | 16888.80 | 12233.10 | 9147.70 | 12280.60 |
| Tensile Stress @ Yld (MPa) | 45.22 | 51.00 | 30.60 | 37.10 | 46.50 |
| Tensile Stress @ Break (MPa) | 44.77 | 51.70 | 30.60 | 37.10 | 46.50 |
| Tensile Strain @ Break (%) | 1.64 | 1.42 | 0.71 | 1.00 | 1.18 |
| Flexural Modulus (MPa) | 7421.29 | 8061.70 | 4063.30 | 3711.00 | 7516.20 |
| Flexural Stress @ Break (MPa) | 75.40 | 61.00 | 43.40 | 50.70 | 11.10 |
| Impact Strength (ft-lb/in) | 0.43 | 0.25 | 0.24 | 0.29 | 0.44 |
| Density | 2.1533 | 1.5703 | 1.6057 | 1.6542 | 1.6120 |

TABLE 5

Experiments - Formulation and Test Results - 11 through 13

| Thermally Conductive + Electrically Insulative | EXPERIMENT # | | |
|---|---|---|---|
| | 11 | 12 | 13 |
| MATERIALS | | | |
| Makrolon 2408 | 21.57 | — | — |
| Powder PC Teijin 1225 WX | — | 34.50 | — |
| Petrothane NA870252 LDPE | — | — | 48.70 |
| Lotader 8900 | 3.16 | 2.00 | — |
| Fusabond E MB-226DE | — | — | 5.00 |
| CBT 100 | 1.83 | 5.00 | — |
| HDPE 511051 | 0.92 | 3.00 | — |
| Geniplast Pellet S | 0.56 | — | 1.00 |
| Kenrich Capow L38/H | — | 0.50 | — |
| Ethanox 310 | — | — | 0.15 |
| Sunox 626 | — | — | 0.15 |
| Duralum Special White Al2O3 180 | 71.96 | — | — |
| PolarTherm 110 | — | — | 15.00 |
| PTX 60 | — | 35.00 | — |
| GFG 200 | — | 20.00 | 10.00 |
| ZoChem 103 | — | — | 20.00 |
| Total | 100 | 100 | 100 |

TABLE 5-continued

Experiments - Formulation and Test Results - 11 through 13

| Thermally Conductive + Electrically Insulative | EXPERIMENT # | | |
|---|---|---|---|
| | 11 | 12 | 13 |
| PROPERTIES | | | |
| Thermal Conductivity (W/mK) | 1.825 | 2.266 | 1.537 |
| Surface Resistance Plaque (ohms/sq) | 9.70E+13 | 1.40E+11 | 1.50E+11 |
| Tensile Modulus (MPa) | 4838.00 | 3906.00 | 1206.80 |
| Tensile Stress @ Yld (MPa) | 17.33 | 28.30 | 13.80 |
| Tensile Stress @ Break (MPa) | 17.30 | 27.70 | 13.70 |
| Tensile Strain @ Break (%) | 1.55 | 2.00 | 6.65 |
| Flexural Modulus (MPa) | 6339.47 | 9251.20 | 989.10 |
| Flexural Stress @ Break (MPa) | 36.04 | 38.80 | 18.00 |
| Impact Strength (ft-lb/in) | 0.32 | 0.31 | 1.44 |
| Density | 2.3277 | 1.5227 | 1.3433 |

TABLE 6

Experiments - Formulation and Test Results - 14 through 18

| Thermally Conductive + Electrically Conductive | EXPERIMENT # | | | | |
|---|---|---|---|---|---|
| | 14 | 15 | 16 | 17 | 18 |
| MATERIALS | | | | | |
| Vectra E950 LCP | 53.50 | — | — | — | — |
| Hival PP 2420 | — | 50.00 | 50.00 | — | — |
| Ultramid A34 | — | — | — | 56.00 | 24.00 |
| LLDPE HIFOR GT4157 | 1.00 | — | — | — | — |
| Cycolac MG94 | — | — | — | — | 5.00 |
| Bondyram 6000 | — | — | — | — | 5.00 |
| Genioplast Pellet S | — | — | — | — | 0.50 |
| Ninor (PSNYL) | — | — | — | — | 0.50 |
| Fusabond 493 | — | — | — | 2.00 | — |
| Uniplex 214 | — | — | — | 1.50 | — |
| ZN Stearate | — | — | — | 0.30 | — |
| Irganox B1171 | — | — | — | 0.20 | — |
| Duralum Special White Al2O3 180 | — | — | — | — | 15.00 |
| Graphite 958M | — | 50.00 | — | — | — |
| Superior 8224 Graphite | 10.00 | — | 50.00 | — | — |
| Tenax C493 | 10.00 | — | — | — | — |
| ZoChem 103 | 25.00 | — | — | — | 45.00 |
| GFG 200 | — | — | — | — | 5.00 |
| xGnP-M-15 | — | — | — | 40.00 | — |
| Graphistrength C100 | 0.50 | — | — | — | — |
| Total | 100 | 100 | 100 | 100 | 100 |
| PROPERTIES | | | | | |
| Thermal Conductivity (W/mK) | 1.853 | 1.150 | 1.195 | 2.410 | 1.435 |
| Surface Resistance Plaque (ohms/sq) | 4.60E+02 | 1.50E+06 | 8.80E+02 | 1.50E+04 | 2.00E+06 |
| Tensile Modulus (MPa) | 9312.70 | 3854.06 | 6671.01 | 6139.14 | 6683.47 |
| Tensile Stress @ Yld (MPa) | 57.50 | 27.60 | 34.61 | 33.41 | 45.40 |
| Tensile Stress @ Break (MPa) | 56.50 | 26.45 | 34.26 | 33.38 | 45.36 |
| Tensile Strain @ Break (%) | 1.71 | 2.11 | 1.68 | 2.63 | 2.08 |
| Flexural Modulus (MPa) | 7399.90 | 4325.92 | 8131.98 | 8230.54 | 8596.17 |
| Flexural Stress @ Break (MPa) | 104.70 | 50.24 | 55.87 | 57.33 | 70.24 |
| Impact Strength (ft-lb/in) | 0.70 | 0.31 | 0.46 | 0.18 | 0.47 |
| Density | 1.8083. | 1.2690 | 1.2740 | 1.3427 | 2.1525 |

TABLE 7

Experiments - Formulation and Test Results - 19 through 23

| Thermally Conductive + Electrically Conductive | EXPERIMENT # | | | | |
|---|---|---|---|---|---|
| | 19 | 20 | 21 | 22 | 23 |
| MATERIALS | | | | | |
| Fortron 0205 PPS | 48.70 | 48.00 | — | — | — |
| Makrolon 2408 | — | — | 14.99 | 35.20 | 39.00 |
| Lotader 8900 | 2.00 | 2.00 | 2.19 | 3.00 | 5.00 |
| Genioplast Pellet S | 1.00 | — | 0.39 | 0.50 | 1.00 |
| CBT 500 | — | — | — | — | 3.00 |
| CBT 100 | 3.00 | — | 1.27 | 1.00 | — |
| Ethanox 310 | 0.15 | — | — | 0.15 | — |

TABLE 7-continued

Experiments - Formulation and Test Results - 19 through 23

| Thermally Conductive + Electrically Conductive | EXPERIMENT # | | | | |
|---|---|---|---|---|---|
| | 19 | 20 | 21 | 22 | 23 |
| Sunox 626 | 0.15 | — | — | 0.15 | — |
| HDPE 511051 | — | — | 0.64 | — | 2.00 |
| Superior 8224 Graphite | — | 50.00 | — | — | — |
| Superior 2025 Graphite | 30.00 | — | — | — | — |
| GFG 200 | 15.00 | — | — | 10.00 | 20.00 |
| Duralum Special White Al2O3 180 | — | — | — | 40.00 | — |
| Zircocem-1 | — | — | — | 10.00 | — |
| 500RL Copper Fibers | — | — | 80.52 | — | 30.00 |
| Total | 100 | 100 | 100 | 100 | 100 |
| PROPERTIES | | | | | |
| Thermal Conductivity (W/mK) | 1.526 | 1.366 | 1.708 | 1.784 | 1.709 |
| Surface Resistance Plaque (ohms/sq) | 6.40E+05 | 3.40E+04 | 1.80E+08 | 3.20E+06 | 2.00E+05 |
| Tensile Modulus (MPa) | 10167.70 | 7548.00 | 3012.20 | 5404.74 | 4543.35 |
| Tensile Stress @ Yld (MPa) | 46.40 | 64.30 | 21.29 | 32.02 | 25.14 |
| Tensile Stress @ Break (MPa) | 46.30 | 64.40 | 21.28 | 32.01 | 26.93 |
| Tensile Strain @ Break (%) | 1.20 | 2.30 | 2.60 | 2.00 | 2.13 |
| Flexural Modulus (MPa) | 12058.80 | 9794.40 | 3763.08 | 7389.80 | 6689.23 |
| Flexural Stress @ Break (MPa) | 69.20 | 96.40 | 45.79 | 53.32 | 51.69 |
| Impact Strength (ft-lb/in) | 0.40 | 0.48 | 0.76 | 0.74 | 0.78 |
| Density | 1.5317 | 1.7407 | 3.7960 | 1.9210 | 1.7023 |

TABLE 8

Experiments - Formulation and Test Results - 24 through 24

| Thermally Conductive + Electrically Conductive | EXPERIMENT # | |
|---|---|---|
| | 24 | 25 |
| MATERIALS | | |
| Stanyl TW341 | 42.00 | — |
| PC/ABS FR2 7001 | — | 44.70 |
| CBT500 | — | 5.00 |
| CBT100 | 2.00 | — |
| Fusabond 493 | 5.00 | — |
| Genioplast Pellet S | 1.00 | — |
| Lotader 8900 | — | 3.00 |
| HDPE 511051 | — | 2.00 |
| Ethanox 310 | — | 0.15 |
| Sunox 626 | — | 0.15 |
| PTX 60 | 30.00 | — |
| GFG 200 | 20.00 | 10.00 |
| ZoChem 103 | — | 34.50 |
| Graphistrength C100 | — | 0.50 |
| Total | 100 | 100 |
| PROPERTIES | | |
| Thermal Conductivity (W/mK) | 2.567 | 1.517 |
| Surface Resistance Plaque (ohms/sq) | 9.50E+05 | 4.30E+05 |
| Tensile Modulus (MPa) | 4594.70 | 4869.90 |
| Tensile Stress @ Yld (MPa) | 20.60 | 34.80 |
| Tensile Stress @ Break (MPa) | 20.60 | 32.60 |
| Tensile Strain @ Break (%) | 1.11 | 1.44 |
| Flexural Modulus (MPa) | 3305.80 | 3683.60 |
| Flexural Stress @ Break (MPa) | 36.10 | 57.10 |
| Impact Strength (ft-lb/in) | 0.23 | 0.36 |
| Density | 1.4230 | 1.7200 |

TABLE 9

Experiments - Formulation and Test Results - 26 through 30

| Thermally Conductive + Flame Retardant | EXPERIMENT # | | | | |
|---|---|---|---|---|---|
| | 26 | 27 | 28 | 29 | 30 |
| MATERIALS | | | | | |
| Ultramid A34 | 35.00 | 37.75 | 35.00 | 35.00 | — |
| Vectra A950 LCP | — | — | — | — | 45.00 |
| HDPE 511051 | 1.00 | 1.00 | 1.00 | 1.00 | — |
| LLDPE HIFOR GT4157 | — | — | — | — | 5.00 |
| Fusabond 493 | 2.00 | 2.00 | 2.00 | 2.00 | — |
| PTFE L-5F | 1.00 | 1.00 | 1.00 | 1.00 | — |
| Ninor (PSNYL) | 0.50 | 0.50 | 0.50 | 0.50 | — |
| Genioplast Pellet S | 0.50 | 0.50 | 0.50 | 0.50 | — |
| Uniplex 214 | — | 0.25 | — | — | — |
| DE-83R | — | — | — | 8.00 | — |
| Saytex 120 | 8.00 | — | — | — | — |

TABLE 9-continued

Experiments - Formulation and Test Results - 26 through 30

| Thermally Conductive + Flame Retardant | EXPERIMENT # | | | | |
|---|---|---|---|---|---|
| | 26 | 27 | 28 | 29 | 30 |
| Perkalite FR100 | — | 10.00 | — | — | — |
| Exolit OP1230 | — | — | 10.00 | — | — |
| Melapur 200 | — | 3.00 | — | — | — |
| Antimony Trioxide | 2.00 | 2.00 | — | 2.00 | — |
| Superior 8224 Graphite | — | — | — | — | 50.00 |
| Cool Flow CF400 | — | — | 10.00 | — | — |
| ZoChem 103 | 50.00 | 42.00 | 40.00 | 50.00 | — |
| Total | 100 | 100 | 100 | 100 | 100 |
| PROPERTIES | | | | | |
| Thermal Conductivity (W/mK) | | 1.184 | 1.440 | | 1.366 |
| Surface Resistance Plaque (ohms/sq) | | 2.00E+12 | 2.80E+12 | | 1.80E+02 |
| Flammability Rating (UL-94) | V = 0 | Not FR | V = 0 | NR | NR |
| Tensile Modulus (MPa) | 3885.79 | 3310.71 | 5466.54 | 3195.85 | 9288.90 |
| Tensile Stress @ Yld (MPa) | 44.98 | 42.51 | 44.01 | 14.06 | 91.40 |
| Tensile Stress @ Break (MPa) | 43.56 | 43.19 | 42.94 | 14.04 | 82.30 |
| Tensile Strain @ Break (%) | 1.78 | 2.24 | 1.80 | 0.75 | 4.18 |
| Flexural Modulus (MPa) | 4536.82 | 3985.43 | 6318.09 | 4492.82 | 7439.40 |
| Flexural Stress @ Break (MPa) | 89.69 | 79.27 | 72.64 | 46.47 | 93.60 |
| Impact Strength (ft-lb/in) | 0.52 | 0.78 | 0.63 | — | 1.27 |
| Density | 2.0607 | 1.8847 | 1.8230 | 1.9517 | 1.6183 |

TABLE 10

Experiments - Formulation and Test Results - 31 through 34

| Thermally Conductive + Flame Retardant | EXPERIMENT # | | | |
|---|---|---|---|---|
| | 31 | 32 | 33 | 34 |
| MATERIALS | | | | |
| Vectra E950 LCP | 44.00 | — | — | — |
| Fortron 0205 PPS | — | 42.00 | 42.00 | 42.00 |
| Fusabond 493 | 5.00 | — | — | — |
| HDPE 511051 | — | 3.00 | 3.00 | 3.00 |
| CBT 100 | — | 2.00 | 2.00 | 2.00 |
| Lotader 8900 | — | 2.00 | 2.00 | 2.00 |
| Genioplast Pellet S | 1.00 | 1.00 | 1.00 | 1.00 |
| Cool Flow CF300 | — | — | 30.00 | — |
| PTX60 | 30.00 | 30.00 | — | 30.00 |
| GFG 200 | 20.00 | 20.00 | 20.00 | — |
| xGnP-M-25 | — | — | — | 20.00 |
| Total | 100 | 100 | 100 | 100 |
| PROPERTIES | | | | |
| Thermal Conductivity (W/mK) | 2.360 | 1.780 | 1.813 | 1.570 |
| Surface Resistance Plaque (ohms/sq) | 2.60E+04 | 2.50E+11 | 1.90E+11 | 2.60E+11 |
| Flammability Rating (UL-94) | — | — | — | — |
| Tensile Modulus (MPa) | 6665.70 | 12776.70 | 10385.10 | 8356.70 |
| Tensile Stress @ Yld (MPa) | 15.90 | 30.50 | 26.00 | 32.30 |
| Tensile Stress @ Break (MPa) | 15.90 | 24.50 | 28.30 | 33.00 |
| Tensile Strain @ Break (%) | 0.58 | 1.48 | 0.66 | 0.86 |
| Flexural Modulus (MPa) | 5110.70 | 3232.10 | 4387.80 | 3653.50 |
| Flexural Stress @ Break (MPa) | 30.50 | 42.80 | 44.70 | 35.00 |
| Impact Strength (ft-lb/in) | 0.26 | 0.24 | 0.24 | 0.24 |
| Density | 1.5540 | 1.5747 | 1.6140 | 1.5177 |

TABLE 11

Experiments - Formulation and Test Results - 35 through 39

| Thermally Conductive + Whiteness Stability | EXPERIMENT # | | | | |
|---|---|---|---|---|---|
| | 35 | 36 | 37 | 38 | 39 |
| MATERIALS | | | | | |
| Vestamid Htplus M3000 | 41.60 | — | 33.50 | 38.50 | 44.20 |
| Ultramid A34 | — | — | 10.00 | — | — |
| Amodel A-1006 | — | 42.20 | — | — | — |
| Kraton 1901G | — | — | 2.00 | — | — |
| HDPE 511051 | — | — | 1.00 | — | — |
| Genioplast Pellet S | — | — | 1.00 | — | — |
| Lotader 4700 | — | 2.00 | — | — | — |

TABLE 11-continued

Experiments - Formulation and Test Results - 35 through 39

Thermally Conductive + Whiteness Stability

| | EXPERIMENT # | | | | |
|---|---|---|---|---|---|
| | 35 | 36 | 37 | 38 | 39 |
| Norac Calcium Stearate | — | 0.50 | — | — | — |
| Benetex OB-1 | — | — | 0.10 | 0.10 | — |
| Polymist F284 | 2.00 | — | 1.00 | 5.00 | — |
| Irganox 1098 | 0.20 | 0.15 | — | 0.20 | 0.35 |
| Irgafos 168 | 0.20 | 0.15 | — | 0.20 | 0.35 |
| Nylostab S-EED Pdr | 1.00 | — | 1.00 | 1.00 | — |
| Tipure R104 | — | 5.00 | — | — | — |
| Weston TNPP | — | — | 0.40 | — | — |
| ZoChem 103 | 55.00 | 35.00 | 50.00 | 55.00 | 55.00 |
| Cool Flow CF400 | — | 15.00 | — | — | — |
| Total | 100 | 100 | 100 | 100 | 100 |
| PROPERTIES | | | | | |
| Thermal Conductivity (W/mK) | 1.52 | 1.80 | 1.390 | 1.591 | 1.53 |
| Surface Resistance Plaque (ohms/sq) | — | — | 3.70E+12 | 2.70E+12 | 4.00E+12 |
| Whiteness Index before heat aging | 54.44 | 65.87 | 77.31 | 87.16 | 66.28 |
| Tensile Modulus (MPa) | 3491.29 | 5491.81 | 3382.05 | — | 3737.52 |
| Tensile Stress @ Yld (MPa) | 29.56 | 44.71 | 30.12 | — | 20.92 |
| Tensile Stress @ Break (MPa) | 29.52 | 54.46 | 26.22 | — | 18.73 |
| Tensile Strain @ Break (%) | 1.22 | 2.11 | 1.12 | — | 0.78 |
| Flexural Modulus (MPa) | 4043.36 | 6836.55 | 3768.66 | — | 4146.80 |
| Flexural Stress @ Break (MPa) | 78.11 | 102.24 | 83.65 | — | 81.68 |
| Impact Strength (ft-lb/in) | 0.47 | 0.63 | 0.53 | — | 0.41 |
| Density | 1.9463 | 1.8993 | 1.8533 | 2.0517 | 1.9757 |

TABLE 12

Experiments - Formulation and Test Results - 40 through 45

| | 40 | 41 | 42 | 43 | 44 | 45 |
|---|---|---|---|---|---|---|
| MATERIALS | | | | | | |
| Fusabond 493 | 2.00 | 2.20 | 1.80 | — | 3.89 | 3.3 |
| Ultramid A34 | 34.75 | 31.08 | 21.20 | — | 29.82 | 26.4 |
| PTFE L-5F | 1.00 | 0.55 | 0.40 | — | — | — |
| Uniplex 214 | 0.25 | 0.28 | 0.20 | — | 0.21 | 0.2 |
| HDPE 511051 | 1.00 | 1.10 | 0.80 | 1.75 | 1.84 | 2.8 |
| Genioplast Pellet S | 0.50 | 0.28 | 0.20 | 1.75 | 0.71 | 0.7 |
| Ninor (PSNYL) | 0.50 | 0.28 | 0.20 | — | — | — |
| Exolit OP 1230 | 18.00 | — | — | — | — | — |
| Saytex 120 | — | 13.75 | 11.20 | — | — | — |
| Al Oxide | — | — | 15.00 | — | — | — |
| Antimony Trioxide | — | 5.50 | 4.00 | — | 2.52 | 2.4 |
| GFG 200/500 | — | — | 3.00 | 13.50 | 6 | — |
| Lotader 8900 | — | — | — | 3.50 | — | — |
| PPS | — | — | — | 50.33 | — | — |
| Ethanox 310 | — | — | — | 0.10 | 0.205 | 0.1 |
| Sunox 626 | — | — | — | 0.10 | 0.205 | 0.1 |
| 8224 or 2025 | — | — | — | 18.75 | 32 | — |
| ZoChem 103 | 42.00 | 45.00 | 42.00 | — | 10 | 40 |
| CNT C100 | — | — | — | 3.20 | — | — |
| Sigrafil C30 | — | — | — | 7.00 | — | — |
| Saytex 8010 | — | — | — | — | 12.6 | 12 |
| Total | 100 | 100 | 100 | 100 | 100 | 100 |
| PROPERTIES | | | | | | |
| Thermal Conductivity (W/mK) | 1.4203 | 1.0813 | 2.3917 | 1.7364 | 2.579 | 1.228 |
| Surface Resistance Plaque(ohms/sq) | 6.20E+11 | 1.70E+13 | 4.50E+10 | 1.60E+03 | 1.50E+05 | 3.70E+12 |
| Flammability Rating (UL-94) @3.2 mm thickness | V0 | V0 | V0 | V0 | V2 | V0 |
| Tensile Modulus (MPa) | 3160.67 | 3912.29 | 5073.63 | 10488.44 | 6564.05 | 3978.19 |
| Tensile Stress @ Yld (MPa) | 30.46 | 46.18 | 30.54 | 43.36 | 35.88 | 43.32 |
| Tensile Stress @ Break (MPa) | 28.96 | 46.52 | 32.1 | 43.36 | 35.79 | 43.31 |
| Tensile Strain @ Break (%) | 2.8 | 1.89 | 1.28 | 1.26 | 1.29 | 1.9 |
| Flexural Modulus (MPa) | 3505.25 | 4539.3 | 5266.43 | 17364.7 | 8073.38 | 4543.2 |
| Flexural Stress @ Break (MPa) | 59.47 | 77.25 | 54.87 | 106.44 | 58.28 | 73.8 |

TABLE 12-continued

Experiments - Formulation and Test Results - 40 through 45

|  | 40 | 41 | 42 | 43 | 44 | 45 |
|---|---|---|---|---|---|---|
| Impact Strength (ft-lb/in) | 0.51 | 0.69 | 0.46 | 0.51 | 0.53 | 0.47 |
| Density | 1.7587 | 2.0427 | 2.338 | 1.517 | 1.7357 | 2.152 |

TABLE 13

Experiments - Formulations and Test Results - 46 through 51

| Thermally Conductive | EXPERIMENT # | | | | | |
|---|---|---|---|---|---|---|
|  | 46 | 47 | 48 | 49 | 50 | 51 |
| MATERIALS | | | | | | |
| Vixtrex 450P | 49.7 | | | | | |
| PTX 60 | 30 | | | | | | 
| BN-PT 110 | 20 | | | 35 | 35 | 40 |
| ELC 626 | 0.15 | | | | | |
| ELC 1010 (Antioxidant) | 0.15 | | | 0.15 | 0.15 | 0.15 |
| Hyprez MA Diamond PDR | | 50 | | | | |
| Powder PC Tejin 1225 WX | | 44 | | | | |
| HDPE | | 2 | 3 | | | |
| CBT 100 | | 3 | 5 | | | |
| PT 110 | | | 40.5 | | | |
| Zhutrex ETPE 60D | | | 49.5 | | | |
| Makralon | | | | | | 5 |
| Victrex | | | | 64.7 | 64.7 | |
| Ultranox 626 | | | | 0.15 | 0.15 | 0.15 |
| Gafone 3300 | | | | | | 54.7 |
| Lotader 8900 | | 1 | 2 | | | |
| Total | 100 | 100 | 100 | 100 | 100 | 100 |
| PROPERTIES | | | | | | |
| Thermal Conductivity (W/mK) | 2.20 | 1.86 | 1.65 | 1.38 | 1.40 | 1.45 |
| Tensile Modulus (MPa) | — | — | — | 6587.7 | 6252.1 | — |
| Tensile Stress @ Yld (MPa) | — | — | — | 71.3 | 75.5 | — |
| Tensile Stress @ Break (MPa) | — | — | — | 71.3 | 75.5 | — |
| Tensile Strain @ Break (%) | — | — | — | 2.43 | 2.96 | — |
| Flexural Modulus (MPa) | — | — | — | 7530.6 | 7054.9 | — |
| Flexural Stress @ Break (MPa) | — | — | — | 122.7 | 138.2 | — |
| Impact Strength (ft-lb/in) | — | — | — | 0.59 | 0.67 | — |
| Density | — | — | — | 1.5297 | 1.5212 | 1.4595 |

While certain representative embodiments and details have been shown for the purpose of illustrating the subject invention, it will be apparent to those skilled in this art that various changes and modifications can be made therein without departing from the scope of the subject invention.

What is claimed is:

1. A light emitting diode fixture having a thermally conductive thermoplastic housing therein which is comprised of (1) at least one light emitting diode, (2) a lens covering a portion of the light emitting diode, (3) a back plate to which the light emitting diode is affixed, (4) the thermally conductive thermoplastic housing for the light emitting diode and the base plate, wherein the housing is comprised of a thermally conductive thermoplastic composition which is comprised of at least one thermoplastic polymer, at least one flame retardant system which is present in the thermally conductive thermoplastic composition at a level which is in the range of 1 to 30 weight percent, and at least one impact modifier, and at least one thermally conductive filler, wherein said flame retardant system includes a primary flame retardant selected from the group consisting of brominated epoxy oligomers, brominated polystyrene, decabromodiphenyl, and decabromodiphenylethane, and a synergist selected from the group consisting of antimony trioxide, antimony dioxide, and zinc borate, wherein the ratio of the primary flame retardant to the synergist is within the range of 5:1 to 3:1, and (5) electrical connectors which are in electrical communication with the light emitting diode and an electrical supply source.

2. The light emitting diode fixture as specified in claim 1 wherein the thermoplastic polymer is selected from the group consisting of polyamides, polycarbonates, polyphenylene sulfides, liquid crystal polymers, and polyesters and wherein the thermally conductive filler is selected from the group consisting of ceramics, metal oxides, minerals and carbon based materials.

3. The light emitting diode fixture as specified in claim 1 which is further comprised of a circuit board which is in electrical communication with the electrical connectors.

4. The light emitting diode fixture as specified in claim 1 wherein the thermally conductive filler is present in the thermoplastic polymer at a level which is within the range of 20 weight percent to 80 weight percent, based upon the total weight of the thermoplastic composition, and wherein the thermally conductive filler is a mixture of thermally conductive fillers having at least two different compositions, at least two different sizes or two different shapes.

5. A light emitting diode fixture having a thermally conductive thermoplastic power supply cup therein which is comprised of (1) at least one light emitting diode, (2) a lens covering a portion of the light emitting diode, (3) a back plate to which the light emitting diode is affixed, (4) a housing for the light emitting diode and the base plate, (5) electrical connectors which are in electrical communication with the light emitting diode and an electrical supply source, and (6) the electrical power supply cup, wherein the electrical power supply cup is comprised of a thermally conductive thermoplastic composition which is comprised of at least one thermoplastic polymer, at least one flame retardant system which is present in the thermally conductive thermoplastic composition at a level which is in the range of 1 to 30 weight percent, and at least one impact modifier, and a thermally conductive filler, wherein said flame retardant system includes a primary flame retardant selected from the group consisting of brominated epoxy oligomers, brominated polystyrene, decabromodiphenyl, and decabromodiphenylethane, and a svnergist selected from the group consisting of antimony trioxide, antimony dioxide, and zinc borate, wherein the ratio of the primary flame retardant to the synergist is within the range of 5:1 to 3:1.

6. The light emitting diode fixture as specified in claim 5 wherein the thermoplastic polymer is selected from the group consisting of polyamides, polycarbonates, potyphenylene sulfides, liquid crystal polymers, and polyesters and wherein the thermally conductive filler is selected from the group consisting of ceramics, metal oxides, minerals and carbon based materials.

7. The light emitting diode fixture as specified in claim 5 wherein the thermally conductive filler is present in the thermoplastic polymer at a level which is within the range of 20 weight percent to 80 weight percent, based upon the total weight of the thermoplastic composition, and wherein the thermally conductive filler is a mixture of thermally conductive fillers having at least two different compositions, at least two different sizes or two different shapes, wherein the thermally conductive fillers are electrically insulated.

8. The light emitting diode fixture as specified in claim 5 which is further comprised of a circuit board which is in electrical communication with the electrical connectors, wherein the circuit board is housed within the electrical power supply cup.

9. The light emitting diode fixture as specified in claim 1 wherein the thermoplastic polymer is a polyamide.

10. The light emitting diode fixture as specified in claim 1 wherein the thermoplastic polymer is a polyamide 66.

11. The light emitting diode fixture as specified in claim 1 wherein the primary flame retardant is brominated polystyrene.

12. The light emitting diode fixture as specified in claim 11 wherein the synergist is antimony trioxide.

13. The light emitting diode fixture as specified in claim 1 wherein the flame retardant system is present in the thermally conductive thermoplastic composition at a level which is in the range of 10 weight percent to 20 weight percent.

14. The light emitting diode fixture as specified in claim 1 wherein the flame retardant system is present in the thermally conductive thermoplastic composition at a level which is in the range of 12 weight percent to 16 weight percent.

15. The light emitting diode fixture as specified in claim 1 wherein the impact modifier is present at a level which is within the range of 2 weight percent to 50 weight percent.

16. The light emitting diode fixture as specified in claim 1 wherein the impact modifier is present at a level which is within the range of 10 weight percent to 45 weight percent.

17. The light emitting diode fixture as specified in claim 1 wherein the impact modifier is present at a level which is within the range of 15 weight percent to 40 weight percent.

18. The light emitting diode fixture as specified in claim 5 wherein the thermoplastic polymer is a polyamide.

19. The light emitting diode fixture as specified in claim 5 wherein the primary flame retardant is brominated polystyrene.

20. The light emitting diode fixture as specified in claim 5 wherein the synergist is antimony trioxide.

* * * * *